US010049340B2

(12) United States Patent
Notani et al.

(10) Patent No.: US 10,049,340 B2
(45) Date of Patent: Aug. 14, 2018

(54) SYSTEM AND COMPUTER PROGRAM FOR A GLOBAL TRANSACTION MANAGER IN A FEDERATED VALUE CHAIN NETWORK

(71) Applicants: Ranjit Notani, Southlake, TX (US); Greg Brady, Dallas, TX (US)

(72) Inventors: Ranjit Notani, Southlake, TX (US); Greg Brady, Dallas, TX (US)

(73) Assignee: One Network Enterprises, Inc., Dallas, TX (US)

( * ) Notice: Subject to any disclaimer, the term of this patent is extended or adjusted under 35 U.S.C. 154(b) by 280 days.

(21) Appl. No.: 14/266,378

(22) Filed: Apr. 30, 2014

(65) Prior Publication Data
US 2015/0006427 A1    Jan. 1, 2015

Related U.S. Application Data

(63) Continuation-in-part of application No. 13/784,752, filed on Mar. 4, 2013, which is a continuation of
(Continued)

(51) Int. Cl.
*G06Q 10/00*    (2012.01)
*G06Q 10/08*    (2012.01)
(Continued)

(52) U.S. Cl.
CPC .......... *G06Q 10/087* (2013.01); *G06Q 10/08* (2013.01); *G06Q 10/0833* (2013.01); *G06Q 20/203* (2013.01); *G06Q 30/0202* (2013.01)

(58) Field of Classification Search
CPC ...... G06Q 10/087; G06Q 10/06; G06Q 10/08; G06Q 10/067; G06Q 10/063; G06Q 10/0631; G06Q 20/203
(Continued)

(56) References Cited

U.S. PATENT DOCUMENTS 5,615,109 A * 3/1997 Eder ........................... 705/7.12
6,609,101 B1 * 8/2003 Landvater ................... 705/7.25
(Continued)

OTHER PUBLICATIONS

Stefansson, Gunnar. "Business-to-Business data sharing: a source for integration of supply chains." International Journal of Production Economics, vol. 75, No. 1-2, 2002, pp. 135-146. (Year: 2002).*
(Continued)

*Primary Examiner* — William S Brockington, III
(74) *Attorney, Agent, or Firm* — Karl L. Larson

(57) ABSTRACT

A system, computer program product and method for a global transaction manager in a federated value chain network. The federated value chain network includes a plurality of local networks having shared access to two or more shared databases on a service provider computer over a network via a database router module. The computer program product includes receiving a request for an order for goods or services from a first company in one of the plurality of local networks in the federated value chain network, searching for one or more second companies having matching goods or services over one or more of the plurality of local networks, sourcing the matched one or more second companies, creating a transaction over one or more segments to effect the movement of the good or services, involving one or more third companies, from a source location to a destination location, and managing the handoffs between the relevant first, second and third companies in order to ship the goods or services.

9 Claims, 18 Drawing Sheets

Related U.S. Application Data application No. 12/730,805, filed on Mar. 24, 2010, now Pat. No. 8,392,228, and a continuation-in-part of application No. 10/887,468, filed on Jul. 8, 2004.

(51) Int. Cl.
*G06Q 20/20* (2012.01)
*G06Q 30/02* (2012.01)

(58) Field of Classification Search
USPC .............................................. 705/7.11–7.42
See application file for complete search history.

(56) References Cited

U.S. PATENT DOCUMENTS

| | | | |
|---|---|---|---|
| 6,804,657 B1* | 10/2004 | Sultan | 705/7.31 |
| 7,130,807 B1* | 10/2006 | Mikurak | 705/7.25 |
| 7,797,182 B2* | 9/2010 | Lindquist et al. | 705/7.31 |
| 2002/0013721 A1* | 1/2002 | Dabbiere | G06Q 10/06 705/26.2 |
| 2002/0091699 A1* | 7/2002 | Norton | G06Q 10/087 |
| 2002/0138316 A1* | 9/2002 | Katz et al. | 705/7 |
| 2004/0088239 A1* | 5/2004 | Eder | 705/36 |
| 2004/0098296 A1* | 5/2004 | Bamberg et al. | 705/10 |
| 2004/0117048 A1* | 6/2004 | Wei | 700/100 |
| 2004/0128261 A1* | 7/2004 | Olavson et al. | 705/400 |
| 2004/0181378 A1* | 9/2004 | Gilmore | 703/6 |
| 2005/0065859 A1* | 3/2005 | Uchida | G06Q 30/0617 705/26.8 |
| 2005/0131755 A1* | 6/2005 | Chen et al. | 705/10 |
| 2005/0177435 A1* | 8/2005 | Lidow | G06Q 10/06 705/22 |
| 2007/0225949 A1* | 9/2007 | Sundararajan et al. | 703/2 |
| 2008/0052149 A1* | 2/2008 | Fischer et al. | 705/10 |
| 2008/0140676 A1* | 6/2008 | Silverstone | G06Q 10/06 |
| 2010/0217712 A1* | 8/2010 | Fillmore | 705/80 |
| 2012/0173381 A1* | 7/2012 | Smith | G06Q 10/00 705/26.5 |

OTHER PUBLICATIONS

Mentzer, John T, et al. "The nature of interfirm partnering in supply chain management." Journal of Retailing, vol. 76, No. 4, 2000, pp. 549-568. (Year: 2000).*

\* cited by examiner

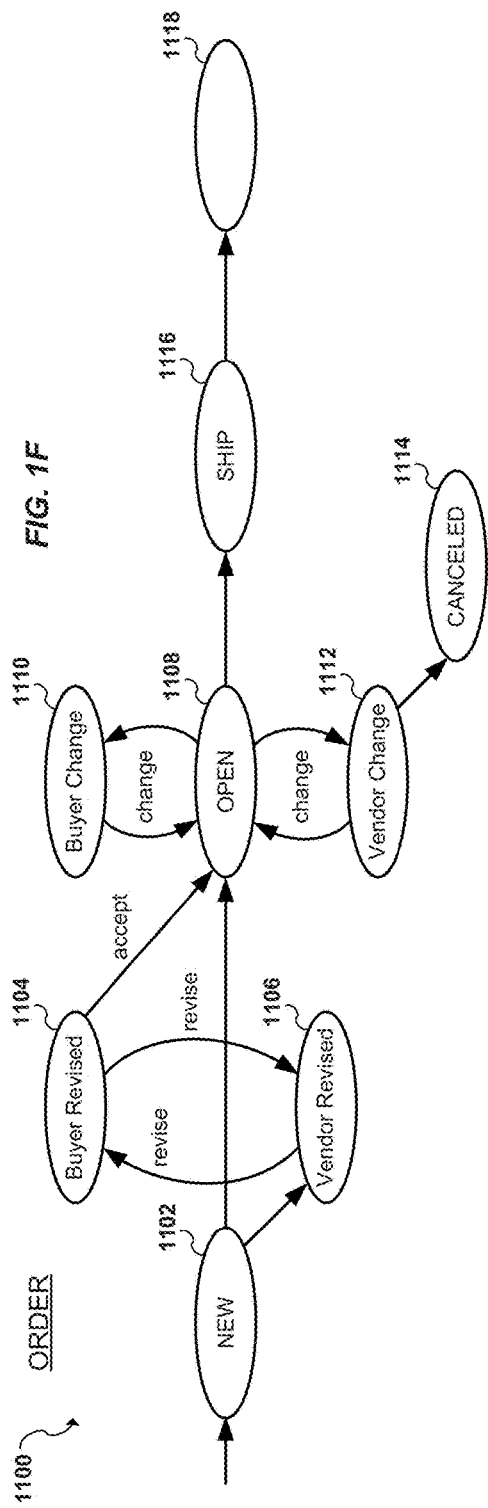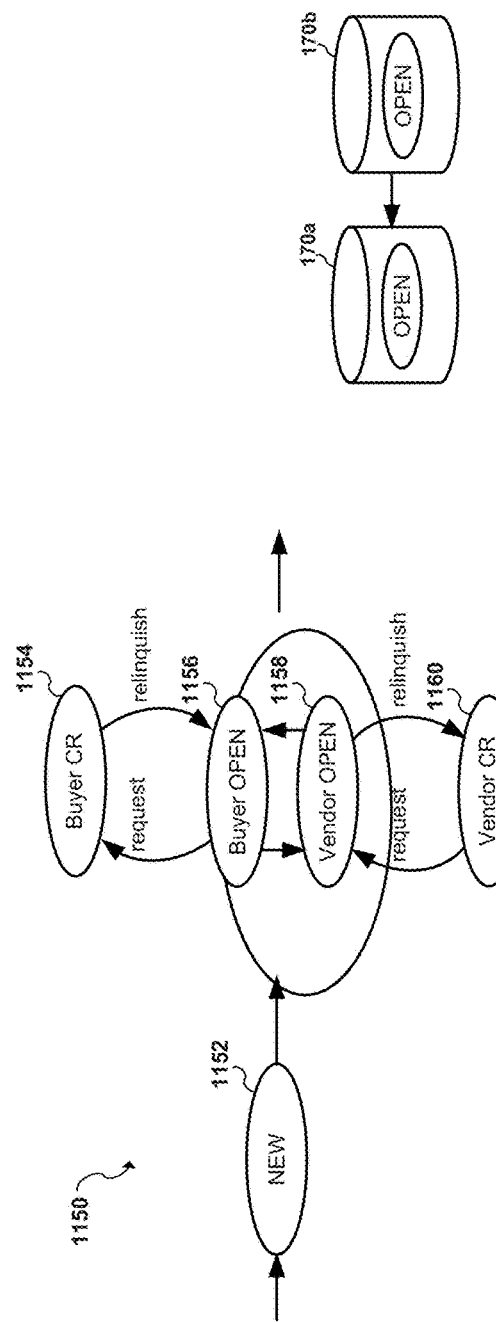

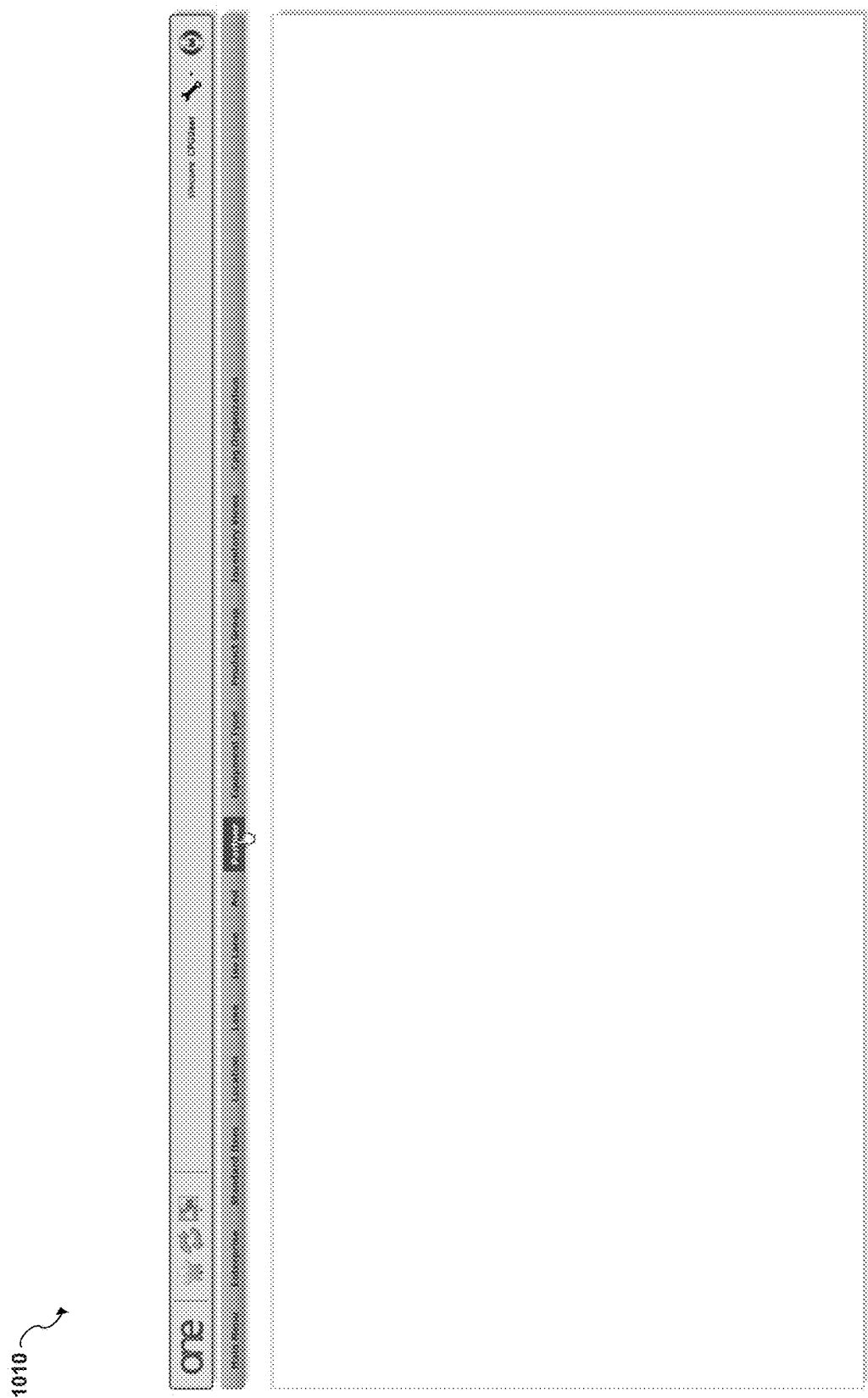

SYSTEM AND COMPUTER PROGRAM FOR A GLOBAL TRANSACTION MANAGER IN A FEDERATED VALUE CHAIN NETWORK

CROSS REFERENCE TO RELATED APPLICATIONS

The present application is a continuation-in-part of and claims priority to U.S. patent application Ser. No. 13/784,752, entitled "Computer Program Product and Method for Sales Forecasting and Adjusting a Sales Forecast," filed in the U.S. Patent and Trademark Office on Mar. 4, 2013, which is a continuation-in-part of and claims priority to U.S. patent application Ser. No. 10/887,468, entitled "Non-stale Incremental Planning," filed in the U.S. Patent and Trademark Office on Jul. 8, 2004, and a continuation of and claims priority to U.S. patent application Ser. No. 12/730,805, now U.S. Pat. No. 8,392,228, entitled "Computer Program Product and Method for Sales Forecasting and Adjusting a Sales Forecast," filed in the U.S. Patent and Trademark Office on Mar. 24, 2010, each having at least one common inventor as the present document and hereby incorporated by reference.

BACKGROUND OF THE INVENTION

Field of the Invention

The present invention is generally related to enterprise value chains, and more particularly to a system and computer program for a global transaction manager in a federated value chain network.

Discussion of the Background

In an increasingly global economy, there is a need for computer networks to share information between computer applications and to better adapt to meet the needs of the business enterprise(s) and computer applications using such networks. Business enterprises of all types are faced with the challenge of managing and optimizing ever more complex supply chains. These supply chains, often called "value chains," are characterized by a high degree of collaboration, cooperation, and interdependency between the enterprise and other entities or partners in the chain (e.g., raw materials producers, component manufacturers, distributors, and the like). The business goal of managing and optimizing a value chain is to minimize the costs incurred by all participants in the chain while maintaining a high level of customer service and maximizing profits. In order to achieve this goal, the enterprise strives to reduce the quantity of stored goods in the value chain, while minimizing opportunity loss by maintaining a sufficient inventory level to satisfy customer demand.

A typical value chain and/or supply chain may span multiple companies and/or entities and sometimes include hundreds or even thousands of companies and/or entities. In the prior art, each company and/or entity maintained its own separate value chain system. In particular, each company and/or entity maintained its own value chain network locally on its own computer systems, databases and computer programs associated with the value chain network. Even with so-called multi-tier or multi-echelon systems known in the prior art, each company and/or entity maintained its own multi-tier or multi-echelon system. The companies would then typically communicate with other companies in the value chain via exchange messages (typically EDI). These techniques are inherently flawed. According to the prior art, each company had to potentially integrate their own internal value chain with many if not all of the other companies in the value chain leading to $n^2$ integrations, where 'n' is the number of companies in the value chain. Such an arrangement required additional time and expense in setting up and managing the value chain, and was highly coupled. Due to the high degree of coupling in the prior art, any changes in the value chain typically resulted in extensive modifications throughout the value chain. Further, due to the size and complexity of most value chains, schedule-driven and batch processing value chain management systems of the prior art often resulted in stale or out of date data being used. This led to expensive reconciliation and significantly limited the types of processes that could be executed. It was also difficult if not impossible to deploy new multi-company processes using the techniques known in the prior art. Finally, visibility beyond a company's immediate neighbors was problematic because multi-tier visibility was difficult if not impossible to obtain and to orchestrate.

For example, distributed databases are known in the prior art. A distributed database is a database that is under the control of a central database management system (DBMS) in which storage devices are not all attached to a common CPU. Distributed databases may instead be stored in multiple computers located in the same physical location or may be dispersed over a local area network (LAN) of interconnected computers. For numerous reasons, distributed databases are inherently flawed and not viable options for creating a federated value chain network, as described herein. For instance, distributed databases require all participants to use the same database (often the same version). They also require the database to be directly exposed instead of exposing the application programming interface (API) of the application. Directly exposing the database leads to a high degree of coupling. Any changes to a highly coupled database typically result in extensive modifications. Members of a value chain typically cannot independently upgrade using distributed databases because of this high degree of coupling, which makes distributed databases infeasible in practice as independently upgrading members in a federated network is an important practical requirement. Further, distributed databases do not have fault tolerance, resulting in issues like "split-brain." Distributed databases also require proximity and may be dispersed over a LAN of interconnected computers, but are not practical to deploy over a wide area network (WAN). As such, distributed databases cannot be deployed in a global environment over a WAN. Finally, distributed databases are designed for "synchronous" environments and do not operate well in asynchronous environments.

Thus, there currently exist deficiencies associated with enterprise value chain replenishment, order and logistics planning and execution, and, in particular, with a global transaction manager in a federated value chain network.

SUMMARY OF THE INVENTION

Accordingly, one aspect of the present invention is to provide a computer program product embodied on a non-transitory computer readable medium for a global transaction manager in a federated value chain network. The federated value chain network includes a plurality of local networks having shared access to two or more shared databases on a service provider computer over a network via a database router module. The computer program is implemented by one or more processors executing processor instructions. The computer program product includes: (i) a first computer code for receiving a request for an order for goods or services from a first company in one of the plurality of local networks in the federated value chain network; (ii)

a second computer code for searching for one or more second companies having matching goods or services over one or more of the plurality of local networks; (iii) a third computer code for sourcing the matched one or more second companies; (iv) a fourth computer code for creating a transaction over one or more segments to effect the movement of the good or services, involving one or more third companies, from a source location to a destination location; and (v) a fifth computer code for managing the handoffs between the relevant first, second and third companies in order to ship the goods or services.

Another aspect of the present invention is to provide a system for a global transaction manager in a federated value chain network. The system includes: (i) a plurality of remote computers; (ii) a central server; (iii) a network interface in communication with the central server and the plurality of remote computers over a network; and (iv) a shared database in communication with the central server. The network interface is configured to receive one or more transactions via the network. The federated value chain network includes a plurality of local networks having shared access to two or more shared databases on a service provider computer over a network via a database router module. The central server is configured to: (a) receive a request for an order for goods or services from a first company in one of the plurality of local networks in the federated value chain network; (b) search for one or more second companies having matching goods or services over one or more of the plurality of local networks; (c) source the matched one or more second companies; (d) determine whether there is available supply or demand for the order; (e) create a transaction over one or more segments to effect the movement of the good or services from a source location to a destination location, wherein the movement involves one or more third companies; and (f) manage the handoffs between the relevant first, second and third companies in order to ship the goods or services.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein:

FIGS. 1F-1G are block diagrams illustrating exemplary states for an exemplary federated value chain network in accordance with an embodiment of the present invention;

FIGS. 5A-5C illustrate portions of a computer-based system in a federated value chain network in accordance with an embodiment of the present invention.

DETAILED DESCRIPTION OF THE PREFERRED EMBODIMENTS

Figure 1A:
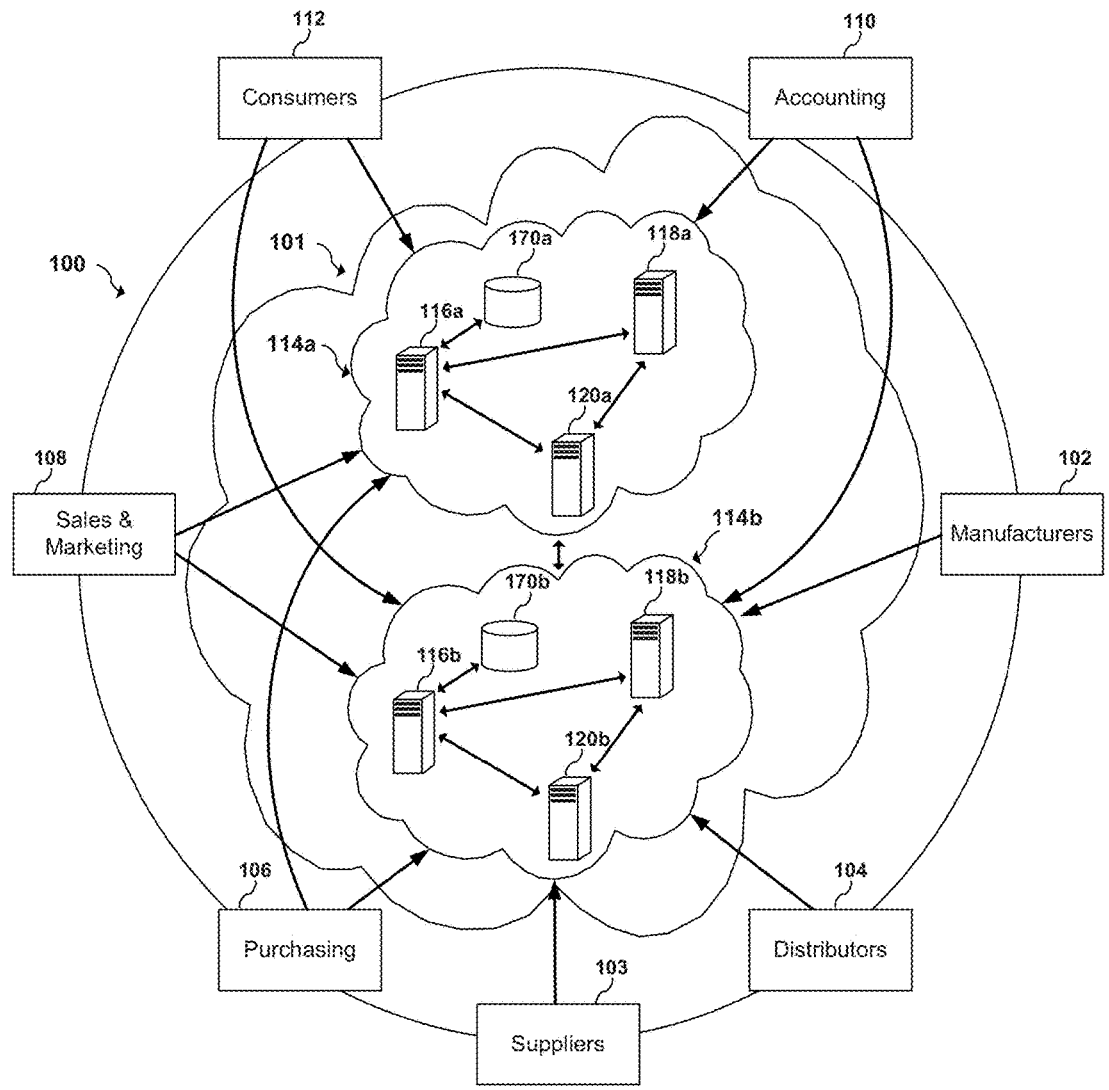
FIG. 1A is a block diagram illustrating an exemplary federated value chain network (or portion thereof) for an exemplary enterprise in accordance with an embodiment of the present invention.

Referring now to the drawings, wherein like reference numerals designate identical or corresponding parts throughout the several views, preferred embodiments of the present invention are described.

The present invention provides a computer program and method for a global transaction manager in a federated value chain network, as described herein.

Global Transaction Manager

Transactions involving goods and/or services may occur anywhere and involve multiple third-parties in regions that are remote to the where the order was originally placed. The transactions may span multiple value chain management systems representing different geographic regions throughout the world. With transactions potentially involving companies around the world, the need for increased visibility and improved management requires a common technological solution. The present invention relates to a global transaction manager in a federated value chain network, as described below. The global transaction manager includes a software module that is responsible for managing all aspects of these transactions and providing information related to the transactions to all of the relevant parties related to the transactions. Utilizing the functionality of the federated value chain network, the information provided to the relevant parties is more accurate and easier to use than anything known in the prior art.

Referring to FIGS. 1B-1E, block diagrams illustrating an exemplary federated value chain network (or portion thereof) utilizing a global transaction manager (GTM) 177 for an exemplary enterprise in accordance with an embodiment of the present invention, is shown. The global transaction manager 177, also referred to as the ONE Orchestrator, utilizes the federated value chain network 100 and provides support for a global trading community. The resulting architecture includes built in redundancies.

The global transaction manager 177 manages transactions relating to goods and/or services within a federated value chain network 100. According to one embodiment, the global transaction manager 177 is responsible for sourcing orders to one or more entities across the federated value chain network 100 and matching supply/demand to confirm supply availability. Consumers 112 may place orders for goods and/or services from the consumer's native or local value chain management system 114a-114b. The order may involve multiple companies and/or entities spanning multiple value chain management systems 114a-114b. One or more suppliers 103, manufacturers 102, distributors 104 and/or other entities in one or more supply chains provide information relating to available goods and/or services using one or more interfaces, including without limitation web-based graphical user interfaces, provided by the global transaction manager 177. For example, one or more suppliers 103, manufacturers 102, distributors 104 and/or other entities in one or more supply chains can publish a catalogue of goods and/or services, current excess capacity, inventory, and the like, using the global transaction manager 177. This information is stored in one or more databases 170a-170e. In order to properly source the order, the global transaction manager 177 searches for one or more suppliers 103, manufacturers 102, distributors 104 and/or other entities in the one or more supply chains that match the criteria of the consumer's order. The global transaction manger 177 also matches supply/demand to confirm supply availability with respect to the information matching the search criteria. This information is presented to the consumer 112 using a common web-based graphical user interface regardless of whether the one or more suppliers 103, manufacturers 102, distributors 104 and/or other entities span multiple value chain management systems 114a-114b. The consumers 112 can use the web-based graphical user interfaces to place orders. The global transaction manager 177 accesses the one or more databases 170a-170e and provides information relating to the goods and/or services through the web server query router 171 and the supply chain router 173, as implemented by the federated value chain network 100.

According to one embodiment, the global transaction manager 177 includes a software module that tracks orders during all stages of the value chain and provides visibility to all of the relevant parties (1-n), including without limitation shippers, customers, service providers, and the like, of the order during all stages of the value chain. The global transaction manager 177 also creates and tracks a single or multi-leg transaction (as necessary) to effect the necessary movement from source to destination (source to port, surface, port to destination), and for managing the handoff's between the potentially multiple third-party logistic (3PL) providers. Current order and tracking information relating to the goods and/or services is stored in the one or more databases 170a-170e and presented to the relevant parties via one or more web-based graphical user interfaces.

According to one embodiment, the global transaction manager 177 provides support for sharing physical resources (e.g., containers) amongst potentially multiple shippers in the federated value chain network 100. Tracking and other information relating to the physical resources is stored in the one or more databases 170a-170e. Because the global transaction manager 177 utilizes the federated value chain network 100, the physical resources can move across the multiple value chain management systems 114a-114b.

According to one embodiment, the global transaction manager 177 manages all of the relevant supporting financial transactions related to the order, including without limitation managing the initiation and confirmation documents of such transactions. The financial transactions related to the order may be in the form of electronic e-sign documents or physical documents which are scanned and stored in the one or more databases 170a-170e. Market maker capabilities for the goods and/or services may also be maintained. Market maker capabilities for the goods and/or services may be based on either existing contracts or spot requirements.

Federated Value Chain Network

A federated value chain network is a collection of one or more value chain networks of organizations, people, technology, activities, information and resources involved in moving a product or service from supplier to customer. Each of these one or more value chain networks are interconnected by the federated value chain network. Activities within a federated value chain network transform natural resources, raw materials and components into a finished product that is delivered to the end customer. A federated value chain network is typically utilized where there is a need or a necessity for a value chain to span multiple value chain networks, such as, without limitation, where data associated with the value chain cannot reside on a single database or multiple databases residing on a single server. For instance, in configurations where there are large data requirements, the physical scale-size limitations of the database may be exceeded if a single database is utilized. Use of a single database may also present latency issues where the locations of the database and the value chain members (i.e., where the database is being accessed from) are geographically far apart. For example, latency issues may exist where one or more of the value chain members are located in Africa and the database is located in the United States. The latency issues might be minimized by creating a mini-network in Africa and moving the database to a more geographically proximate location to its members. Other geographic areas include without limitation North America, South Africa, China, Asia and Australia. According to one possible implementation one or more value chain management systems may represent each or any combination of these geographic areas. Further, there may be security reasons which require use of multiple databases. The data associated with the federated value chain network may be partitioned into multiple databases based on a number of factors including, without limitation, function, geography, company, or any combination thereof.

Referring to FIG. 1A, a block diagram illustrating an exemplary federated value chain network (or portion thereof) for an exemplary enterprise in accordance with an embodiment of the present invention, is shown. The non-limiting exemplary federated value chain network 100 includes both external companies and/or entities (such as manufacturers 102 and distributors 104), and internal companies and/or entities (such as purchasing 106, sales and marketing 108, and accounting 110). Distributors 104 include any company and/or entity engaged in the distribution or marketing of some article or class of goods, including without limitation carriers, and transportation and shipping companies. The internal and external companies and/or entities may also include, without limitation, retailers, raw material suppliers or other suppliers, customers, or any company and/or entity having some connection with the federated value chain network. For instance, but without limitation, any company and/or entity that has some involvement with the production or processing of raw products, the transportation and storage of those products, the processing of those raw products into goods for sale, the transportation and storage of the goods for sale, the sale of those goods to consumers, the contracting of those goods, or the marketing of those goods, would ideally be included in the value chain network. These internal and external companies and/or entities collaborate and share information with one another to provide value to each other and to the enterprise in various ways that are well-known and need not be described here. In some cases, consumers 112 may also be viewed as part of the federated value chain network 100.

The internal and external entities of the federated value chain network 100 are linked together by one or more value chain management systems 114a-114b. Through the one or more value chain management systems 114a-114b, the enterprise and the entities may share data and information, schedule deliveries, and generally work together to achieve the business goal of minimizing inventory for each entity.

The one or more value chain management systems 114a-114b may include, without limitation, one or more computers/servers 116, 118 and 120 in communication with one or more databases 170. The one or more computers/servers 116, 118 and 120, and the one or more databases 170, typically reside, without limitation, at the enterprise, but may be connected to the external entities over a network. For example, FIG. 1A shows two interconnected value chain management systems 114a-114b. The computer servers 116-120 store (e.g., on a computer readable medium and/or one or more databases 170) and execute a value chain management program that includes various application tools for inventory control, purchasing, accounting, and the like. Data, engines, tables and the like associated with the value chain management program may be stored and retrieved, without limitation, in and from, the one or more databases 170.

According to a preferred embodiment, the companies and/or entities are linked via a network, such as without limitation the Internet, an Intranet or other communication network. The system includes one or more computers (e.g., computers/servers 116, 118, and 120) with one or more processors and one or more computer readable storage mediums, such as without limitation a computer hard-drive, removable drive or memory. One or more computer programs (or engines) having executable instructions may be stored on the computer readable storage medium. For instance, the federated value chain network 100 includes a global transaction manager 177 that allows the various entities of the federated value chain network 100 to collaborate with one another and perform certain transactions which may span one or more value chain management systems 114a-114b, such as placing orders for a good or service anywhere in the world.

Transaction and Master Data

Figure 2:
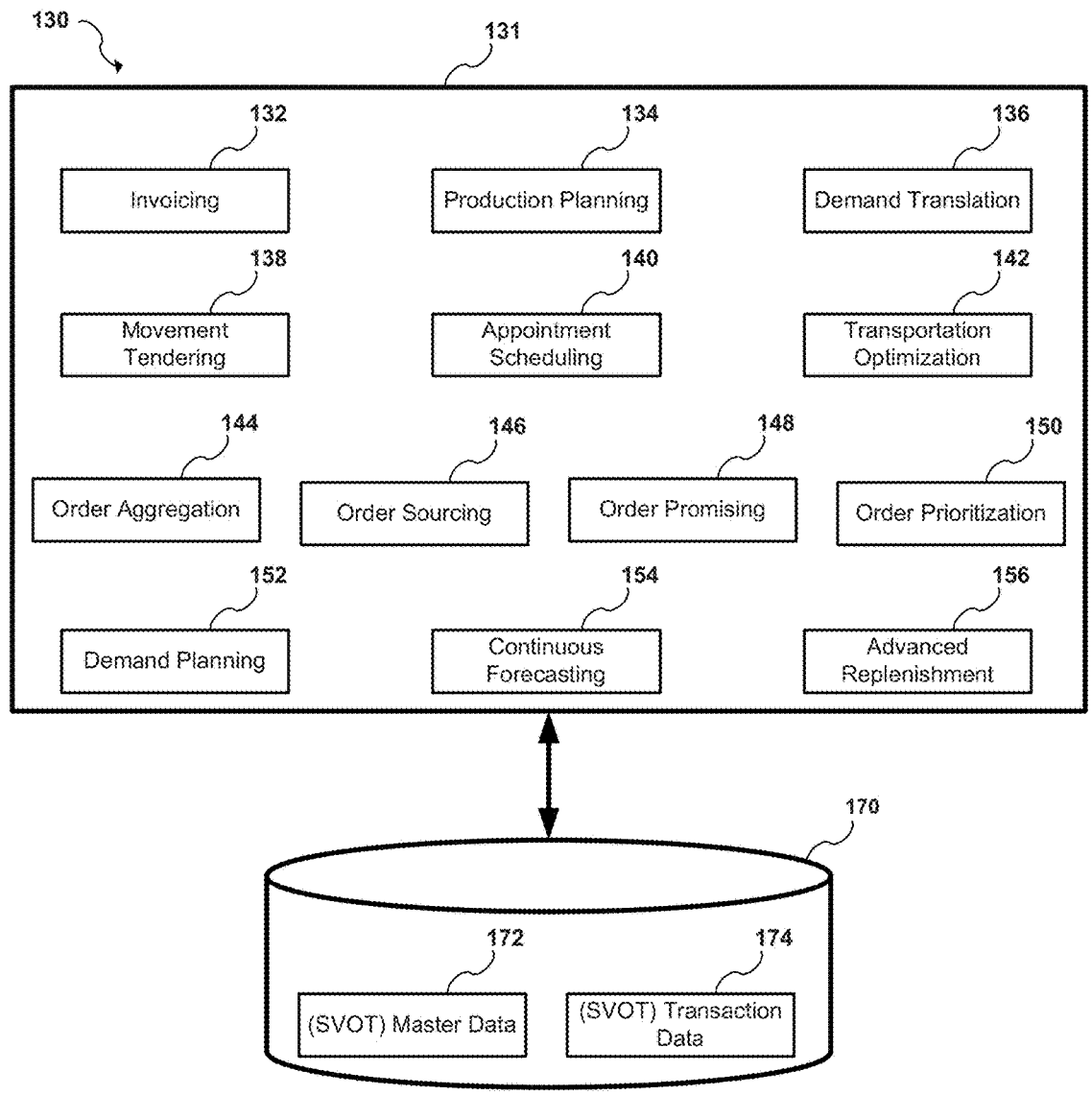
FIG. 2 is a block diagram illustrating a database arrangement for a global transaction manager in a federated value chain network in accordance with an embodiment of the present invention.

According to a preferred embodiment as shown in FIG. 2, the one or more databases 170 include, without limitation, master data 172 and transaction data 174. Because the federated value chain network 100 may include multiple databases 170a-170e, the transaction data 174a-e may reside on multiple databases 170a-170e. However, without limitation, the master data 172 resides on a single database 170a. In a federated value chain network 100, even though multiple databases are utilized, each data element (master data 172 or transactional data 174) has a single database as its owner. Ownership information is maintained regarding the database fields. The web service query router 171, supply chain router 173 and global transaction manager module 177 route database access to the appropriate database 170a-170e.

Master data 172 is typically slow-changing, relatively low volume data. Examples of master data 172 in a federated value chain network 100 might include, without limitation, organization, location, customer, and vendor data. Because of its slow-changing, low-volume characteristic, according to a preferred embodiment, all of the master data for a federated value chain network 100 is implemented on a single database. All changes to the master data are made to this database. A guaranteed message bus may be used to send guaranteed messages between a master data service and any subscribing services.

Transaction data 174 is typically fast-changing, high-volume, stateful data. Examples of transaction data 174 in a federated value chain network 100 might include, without limitation, order, shipment, forecast, and appointment data. In a federated value chain network 100, transaction data 174 may be distributed across multiple databases where each data element is assigned a single database as its owner. Transaction data 174 can either be private to a particular value chain member or shared between multiple value chain members. The transaction data 174 may be on the same database, or on different databases with owned and shared states. For each data element, a database is assigned as its owner. The owning database maintains the authoritative version of truth for a particular transaction. Other databases subscribe to the owning database for changes related to that transaction.

According to one embodiment, without limitation, a value chain member resides on a single database. For transaction data 174 that is private to a particular value chain member, a database on which a value chain member resides is assigned as the owning database. The normal ACID properties of the database are utilized to ensure consistency and atomicity. For transaction data 174 that is shared between multiple value chain members, according to one embodiment, the owning database is the database on which all, or a majority, of the relevant members reside. The normal ACID properties of the database are utilized to ensure consistency and atomicity.

Routing Programs/Interfaces

According to a preferred embodiment, the federated value chain network 100 utilizes one or more routing programs/interfaces (e.g., web service query router 171 and a supply chain router 173) that route database operations within the federated value chain network 100. The one or more routing programs utilize one or more state tables and table routing information to loosely couple the database operations to the appropriate database fields and/or database tables, such that actual underlying database connections and the actual database tables and/or fields are handled transparently to most operations.

Figure 1B:
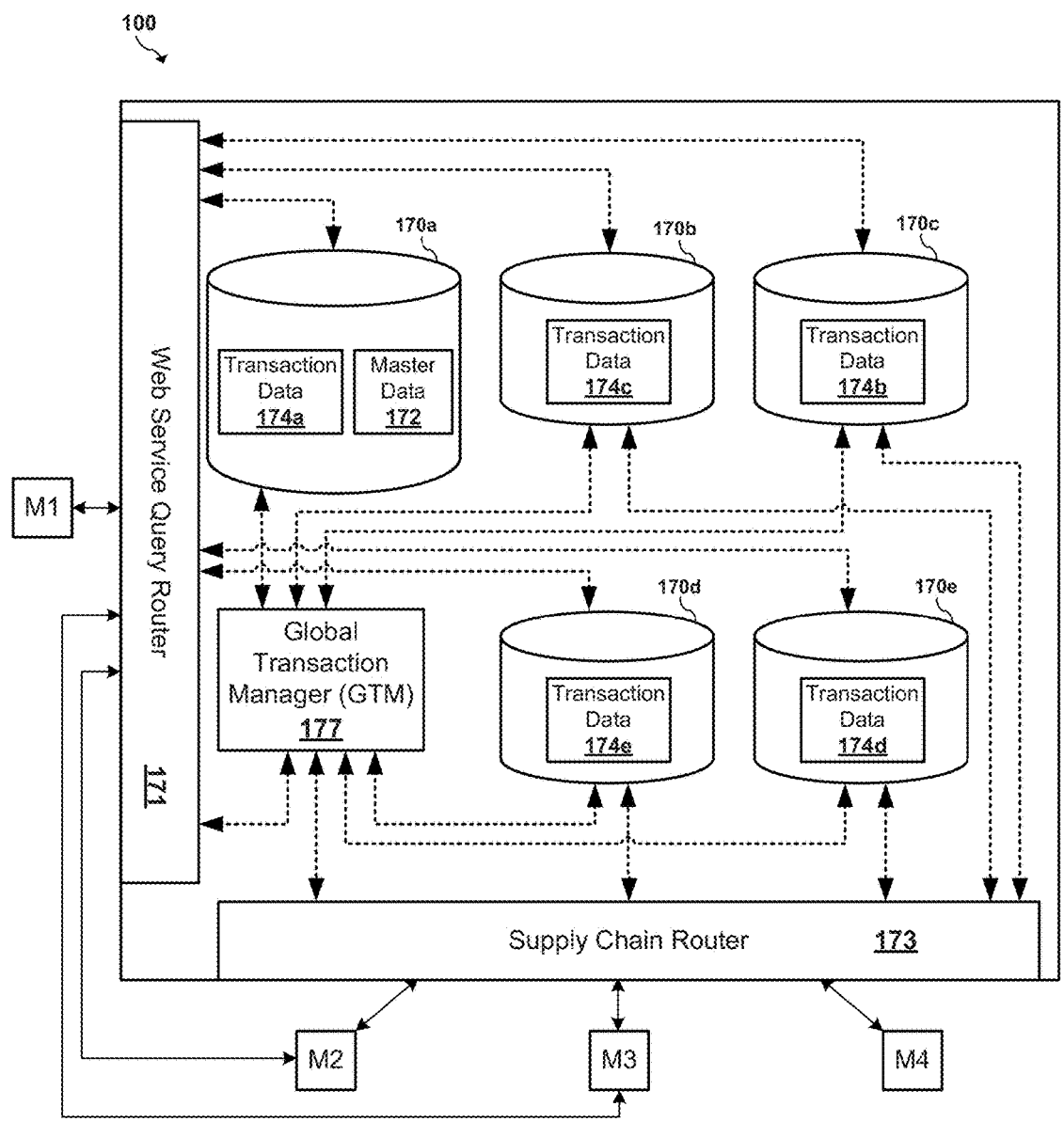
FIGS. 1B-1E are block diagrams illustrating an exemplary federated value chain network (or portion thereof) utilizing a global transaction manager (GTM) for an exemplary enterprise in accordance with an embodiment of the present invention.
Figure 1C:
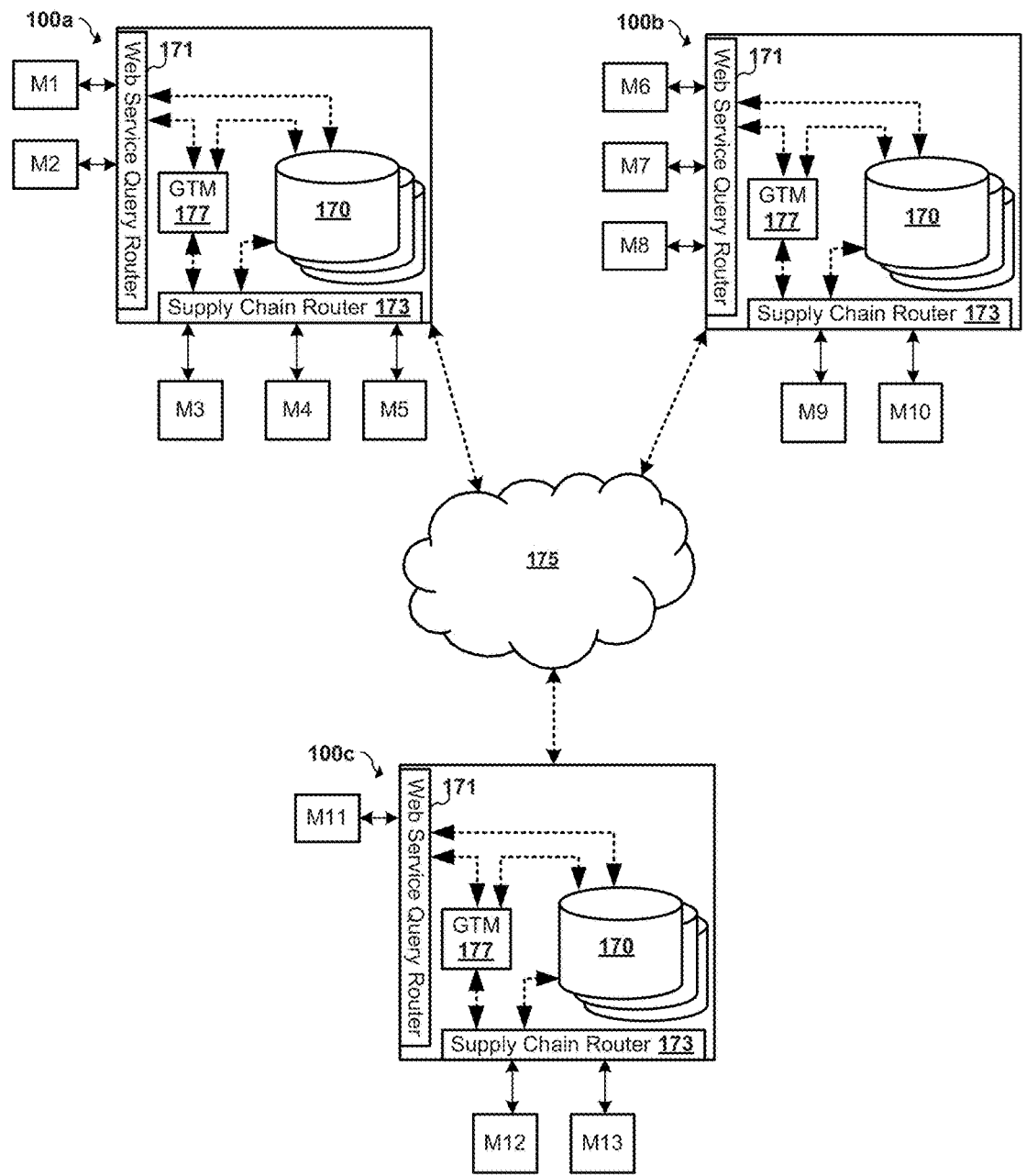
Figure 1D:
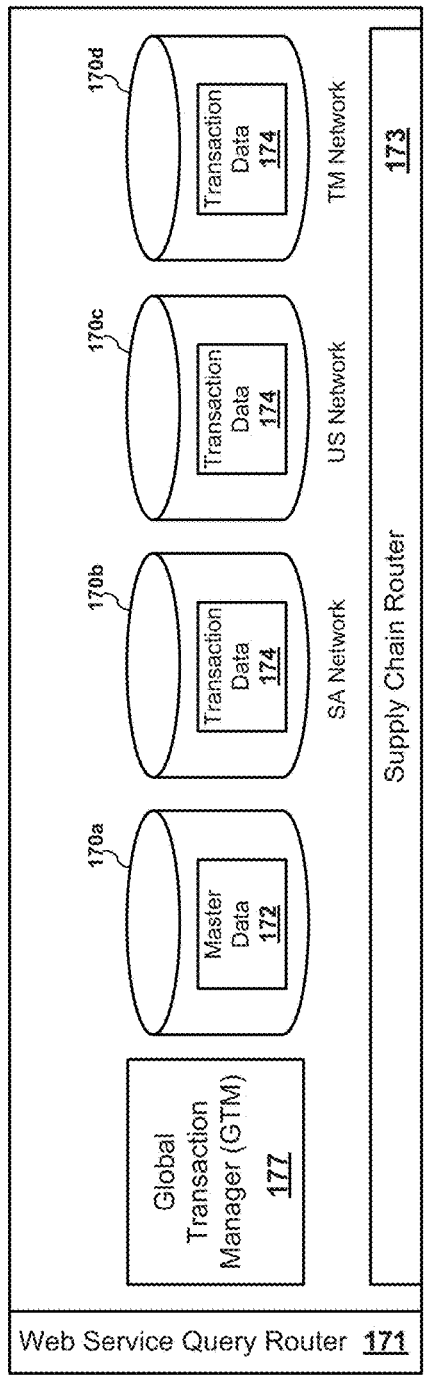
Figure 1E:
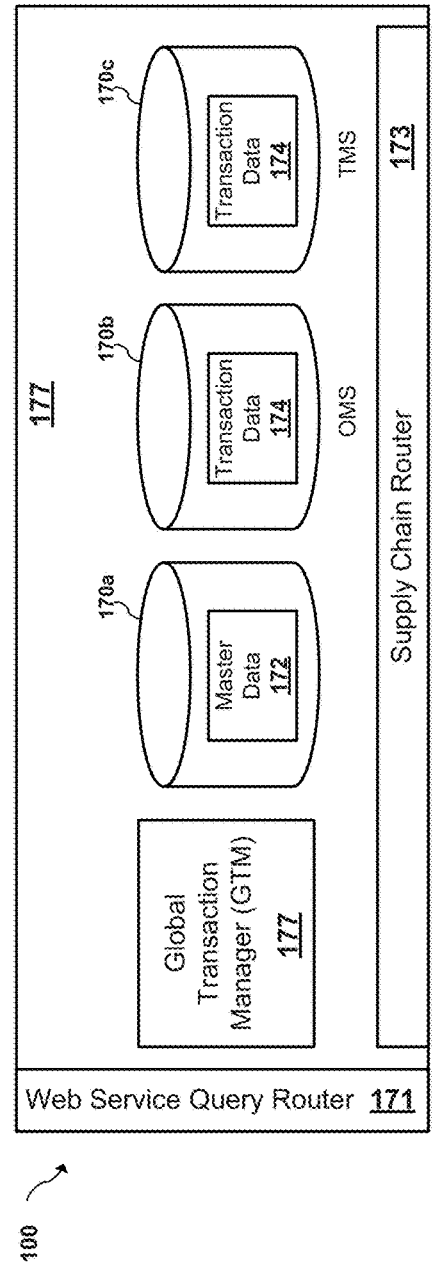

As shown in the non-limiting example in FIG. 1B, members 1-4 access the federated value chain network 100 through varied entry points. As shown, members 1-3 (M1-M3) access the federated value chain network 100 via web service query router 171, as described below, and members 2-4 (M2-M4) access the federated value chain network 100 via supply chain router 173. The web service query router 171 and a supply chain router 173 utilize the one or more state tables and table routing information to link the one or more value chain management systems 114a-114b and their respective database fields and/or database tables. Because a federated value chain network 100 typically may span multiple value chain management systems 114a-114b, database fields and/or database tables which are related may be stored on different value chain management systems 114a-114b.

A process may either be synchronous in that it expects a response, or asynchronous in that it's one-way. A synchronous process is invoked by a request/response operation, and the result of the process is returned to the caller immediately via this operation. An asynchronous process is invoked by a one-way operation and the result and any faults are returned by invoking other one-way operations. The process result is returned to the caller via a callback operation. The present invention may be implemented synchronously, asynchronously, or a combination of both.

According to one embodiment, the Web service query router 171 is configured for synchronous web service requests. The web service requests may utilize any existing or future technology including, without limitation, representational state transfer (REST) web services (JAX-RS). REST is an "architectural style" that exploits the technology and protocols of the Web, including HTTP (Hypertext Transfer Protocol) and XML. However, it is understood that other web service APIs are possible within the scope of the present invention, including without limitation, simple object access protocol (SOAP) and the like.

According to one embodiment, the supply chain router 173 is configured for asynchronous messaging. The messaging may utilize any existing or future technology including, without limitation, socket communication, remote procedure calls (RPC), remote method invocation (RMI), the common object request broker architecture (CORBA), Java CAJO, Microsoft distributed component object model (DCOM), OSF distributed computing environment (DCE) or any other technology that provides communication for distributed systems.

The table routing information, which may be stored in one or more databases 170, contains references to the appropriate database fields and/or tables. Programs that read or write to the database field and/or table utilizing the one or more state tables and table routing information will behave as if operating directly on the target field and/or table, but may in fact actually be operating on remote database fields and/or database tables. However, programs that need to access the database fields and/or tables specifically may identify and manipulate them directly. The table routing information is similar to UNIX symbolic links, in that it contains connecting information to the actual database fields and/or tables and that the operations to such are handled transparently to most of the programs needing access to the database fields and/or tables.

Authoritative Version of Truth

It is important to share the most current information over the federated value network 100. As used herein, an "authoritative version of truth" is an arrangement in which the data in its most current/updated form is accessible by multiple computer applications and/or multiple parties across a federated value network 100. According to at least one embodiment, the authoritative version of truth (AVOT) with respect to the federated value chain network 100, the master data 172 and transaction data 174 is accomplished by use of state tables and table routing information and the cloud arrangement, as described below, that is utilized by the present invention. Notably, the master data 172 and at least portions of the transaction data 174 are shared with other companies and/or entities within each respective chain management system (114*a*-114*b*) because they are both maintained in the "cloud" by the service provider. Such an arrangement of a "cloud" relationship of the data in conjunction with state tables and routing information as described by the present invention is not known in the prior art.

In order to maintain data consistency, data elements are either authoritative data elements or non-authoritative data elements. Write operations to authoritative data elements result in the write operation being pushed to any related non-authoritative data elements. Authoritative data elements have an owned state or a shared state (having temporary ownership) in which a single party is authoritative owner of the respective data element at any given time. The authoritative owner of the respective data elements are maintained in state tables and may be changed based on requests for ownership of the particular data element in order to perform a write operation. Thereby, inconsistencies with respect to the representation of the data are minimized because there is only a single data element that is authoritative at any given time.

Each company and/or entity is restricted by its allowed permissibility which may be predefined and/or configurable. The master and transaction data models represent the authoritative version of truth (AVOT) for the federated value chain network 100 and manage the business process. All the planning and execution engines will read the same data models and write to the same data models thereby eliminating data redundancy and the need for synchronizing data across multiple disconnected systems.

Figure 4A:
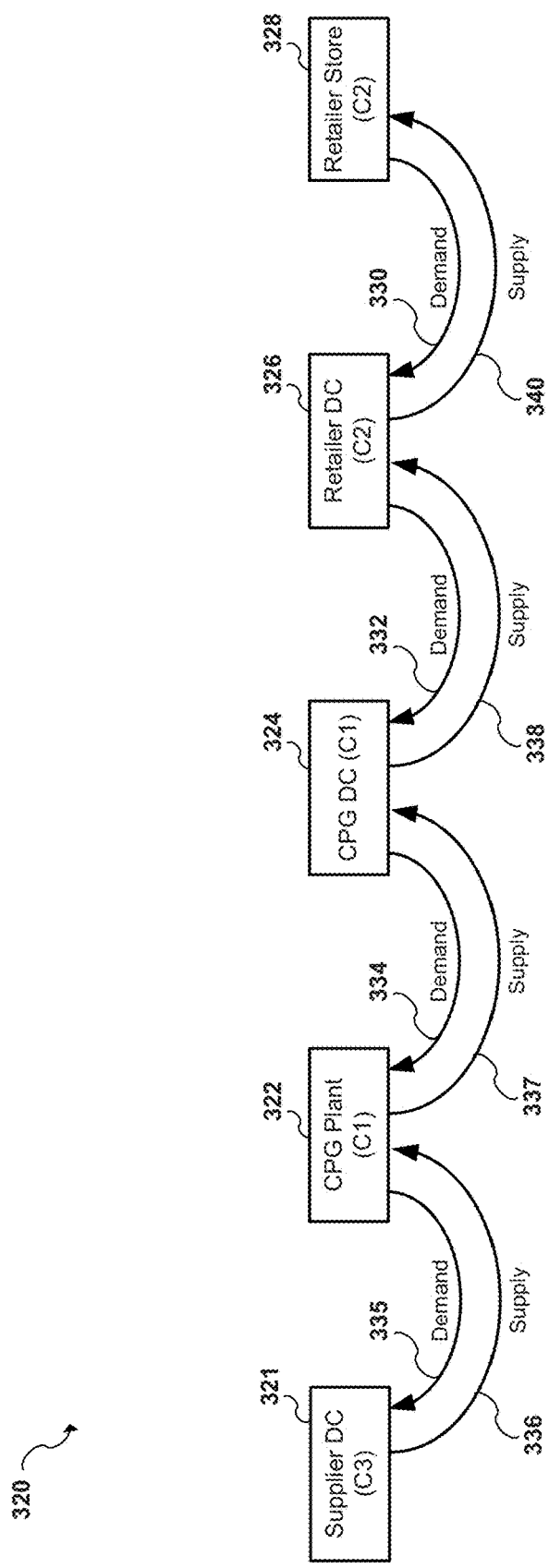
FIG. 4A is a block diagram illustrating demand propagation and supply replenishment over two exemplary companies and/or entities in a supply chain network in accordance with an embodiment of the present invention.
Figure 4B:
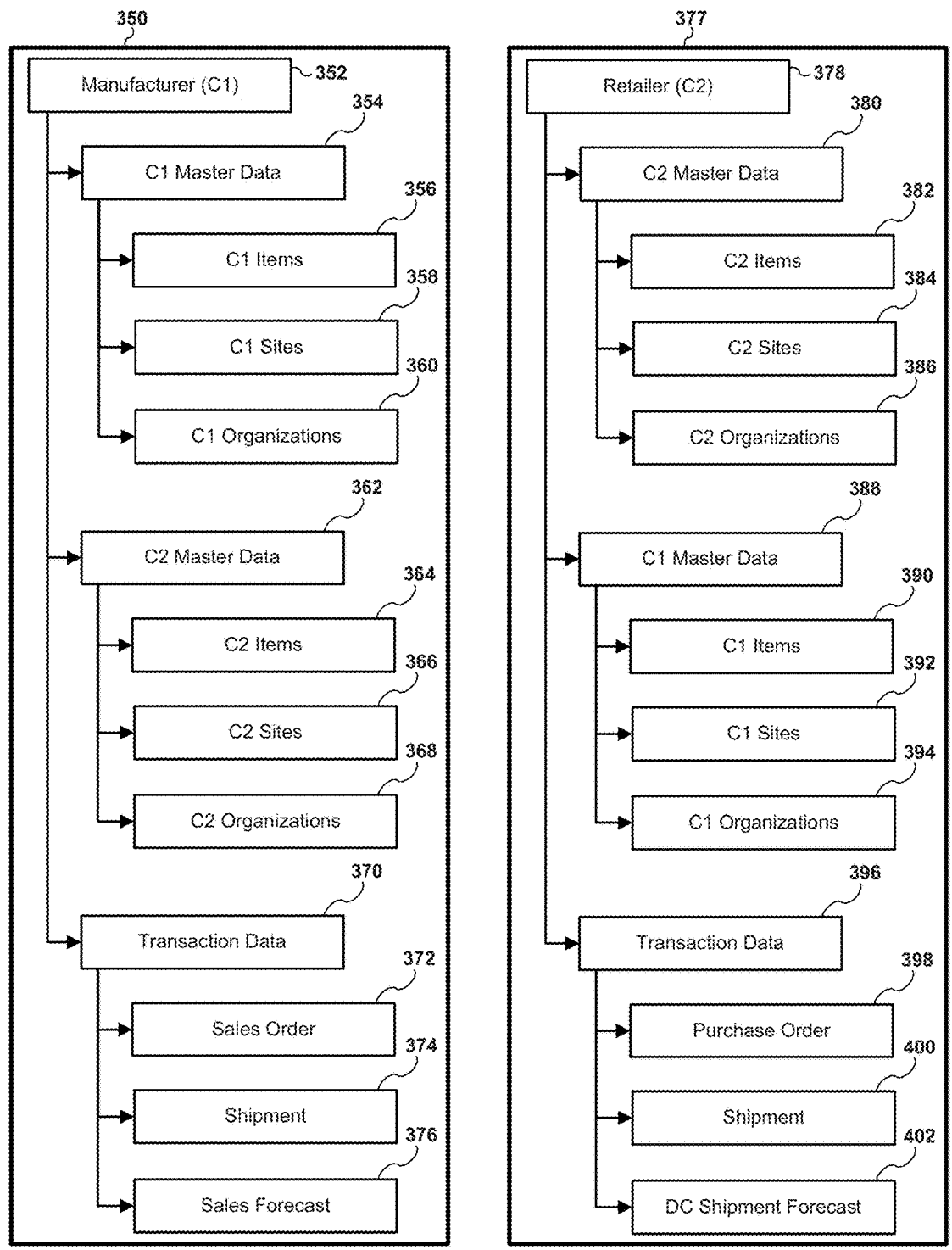
FIG. 4B is a block diagram illustrating a portion of a database arrangement for two exemplary companies and/or entities in a supply chain network in accordance with the prior art.
Figure 4C:
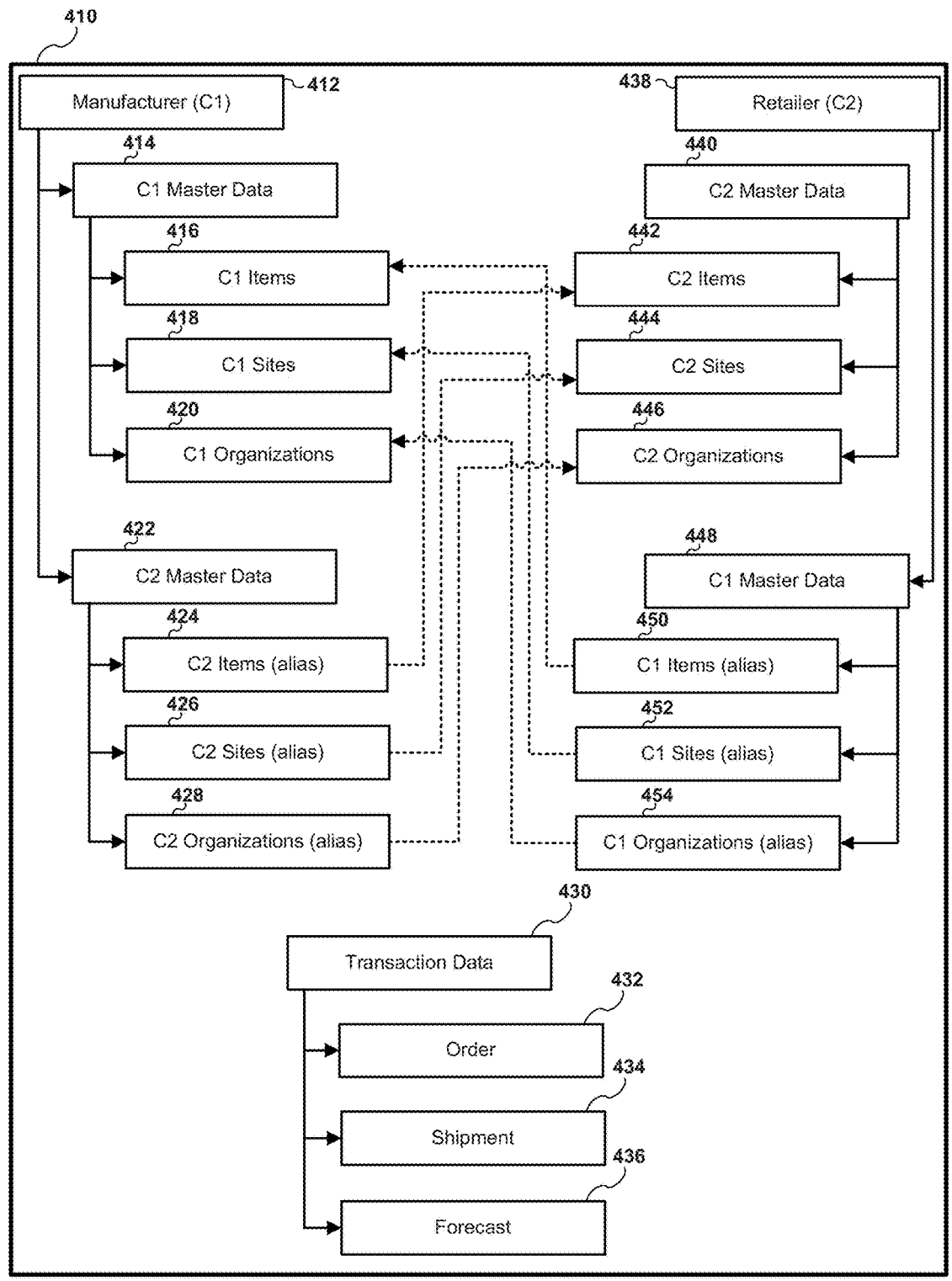
FIG. 4C is a block diagram illustrating a portion of a database arrangement for two exemplary companies and/or entities in a supply chain network in accordance with an embodiment of the present invention.

An authoritative version of truth was not realistic in the prior art. This is best illustrated in FIGS. 4B and 4C, which shows a portion of a database arrangement for two exemplary companies and/or entities in a supply chain network. According to this example, manufacturing company (C1) and retailer (C2) each maintain their own separate computer systems, databases and computer programs which handle the processing for the respective company in the value chain network. Manufacturing company C1's computer systems, databases and computer programs are represented by 350. Retailer company C2's computer systems, databases and computer programs are represented by 377. As such, manufacturing company C1 includes its own master data 354 (such as item 356, site 358, and organization 360) and transaction data 370 (such as sales order 372, shipment 374, sales forecast 376), and replicates at least portions of retail company C2's master data (such as item 364, site 366, and organization 368). Likewise, retail company C2 includes its own master data 380 (such as item 382, site 384, and organization 386) and transaction data 396 (such as purchase order 398, shipment 400, DC shipment forecast 402), and replicates at least portions of manufacturing company C1's master data (such as item 390, site 392, and organization 394). Further, the sales order 372 of manufacturing company C1 and purchase order 398 of retail company C2 includes related information. Also, the sales forecast 376 of manufacturing company C1 and DC shipment forecast 402 of retail company C2 includes related information. Thus, because each company and/or entity maintained its own value chain network locally on its own computer system, the data associated with the value chain is duplicated on wholly independent and separate computer systems, resulting in multiple versions of the truth which is often not up to date. Merely exchanging messages between the independent and separate computer systems does not resolve this issue because there is no authoritative version of truth using a cloud relationship as described herein in the prior art.

State Tables

According to a preferred embodiment, the web service query router 171 and supply chain router 173 utilize one or more state tables and table routing information to loosely couple the database operations to the appropriate database fields and/or database tables.

Database fields and/or database tables are accessed by either read or write database operations. In order to maintain consistent and non-stale data, write operations to database fields and/or database tables having related database fields and/or database tables typically result in updates to those related database fields and/or database tables. According to one embodiment, write operations to database fields and/or database tables having related database fields and/or database tables typically result in one or more messages being communicated to update those related database fields and/or database tables which may span multiple value chain management systems 114*a*-114*b*.

Most transactions are stateful in that they progress through a series of states. For example, an order may progress from a NEW state to an AGREEMENT state to a SHIPPING state and then to a CLOSED state. Actions may be performed on a transaction by one or more value chain members. Actions may cause a state to be changed. If only a single member can perform an action in a given state then that state is referred to herein as an owned state. If multiple members can execute an action in a particular state then that state is referred to herein as a shared state. For transactions that span multiple value chain members located on two or more databases, the transaction as a whole is not owned. Instead, ownership is exchanged between the members. If a state is an owned state, then when a particular transaction reaches that state, ownership is transferred to that member.

According to one embodiment, state machine definitions are a part of the master data 172 and are managed by a network master data service. Because all databases have the same definition of the state machine and the therefore all agree upon who is the owner of an owned state.

According to one embodiment, for shared states, the state machine is transformed into a set of owned sub-states. This transformation is performed transparently by a state machine manager which runs in the network master data service. This process is referred to herein as state machine federated decomposition. One of the sub-states is designated as the primary sub-state. The value chain member associated with the primary sub-state is the primary owner of the transaction in the shared state. When a member associated with a non-primary sub-state (a secondary sub-state) needs to perform an action, ownership of the transaction is requested. If the primary owner currently has ownership and the state of the transaction is in a shared state, then the ownership is transferred to the requesting value chain member. When the state is returned to a shared state by a value chain member, the ownership is transferred to the primary owner for that shared state. Thereby, even a transaction with shared states has a clear owner at all times. According to an alternate embodiment, a shared state can be added to a shared master data model and the same state machine federated decomposition approach is utilized.

Referring to FIGS. 1F-1G, block diagrams illustrating exemplary states for an exemplary federated value chain network 100 in accordance with an embodiment of the present invention are shown. According to the example shown in FIG. 1F, a new order is received and the state is changed to NEW at block 1102. The vendor and/or buyer may negotiate and revise the initial order as shown at blocks 1104 and 1106. If the vendor and buyer come to an agreement, then the order state is changed to OPEN at block 1108. Otherwise, negotiations may continue between the buyer and seller. The vendor and/or buyer may change the order as shown at blocks 1104 and 1106. If the vendor and buyer come to an agreement regarding the change, then the order state is changed to OPEN at block 1108. After completion of the order, the order state may then progress to a COMPLETE state at 1118. If the vendor and buyer do not come to an agreement regarding the change, the order state may be changed to CANCELED at block 1114.

According to the example shown in FIG. 1G, a new order is received and the state is changed to NEW at block 1152. The buyer or the vendor may open the order at blocks 1156 and 1158. If the buyer is not the owner of the data elements associated with changing the order in the one or more databases 170, then the buyer requests temporary ownership to write to the appropriate data elements and then relinquishes temporary ownership at block 1154. If the vendor is not the owner of the data elements associated with changing the order in the one or more databases 170, then the vendor requests temporary ownership to write to the appropriate data elements and then relinquishes temporary ownership at block 1160.

Cloud Arrangement

According to at least one embodiment as shown in FIG. 2, one or more databases 170 are maintained by a service provider, such as One Network, in a cloud arrangement. Multiple companies and/or entities typically on a single server or several tightly coupled servers all under the control of the service provider. The companies and/or entities access the computational resources of the service provider, including, without limitation, one or more databases 170, via a computer network, such as the Internet. This type of arrangement is often referred to as "cloud computing" in that substantially all of the computational resources and databases associated with the federated value chain network 100 is maintained by the service provider which is represented in FIG. 1A as one or more value chain management systems 114*a*-114*b* (or collectively element 101). Each company's and/or entity's computer may contain very little software or data (perhaps a minimal operating system and web browser only), serving as a basic display terminal connected to the Internet to access the service provider. Using the "cloud computing" arrangement of the present invention, each company and/or entity solely within a value chain management system (114*a*-114*b*) share a single version of truth (SVOT) with respect to the respective chain management system (114*a*-114*b*), the master data 172 and transaction data 174, because they are maintained in the "cloud" by the same service provider. Further, companies and/or entities having associations that span one or more value chain management systems 114*a*-114*b* share an authoritative version of truth (AVOT) with respect to the federated value chain network 100, the master data 172 and transaction data 174 while still being loosely coupled because of the "cloud" arrangement and the use of routing programs, state tables and table routing information utilized by the federated value chain network 100 as described herein.

Figure 5A:
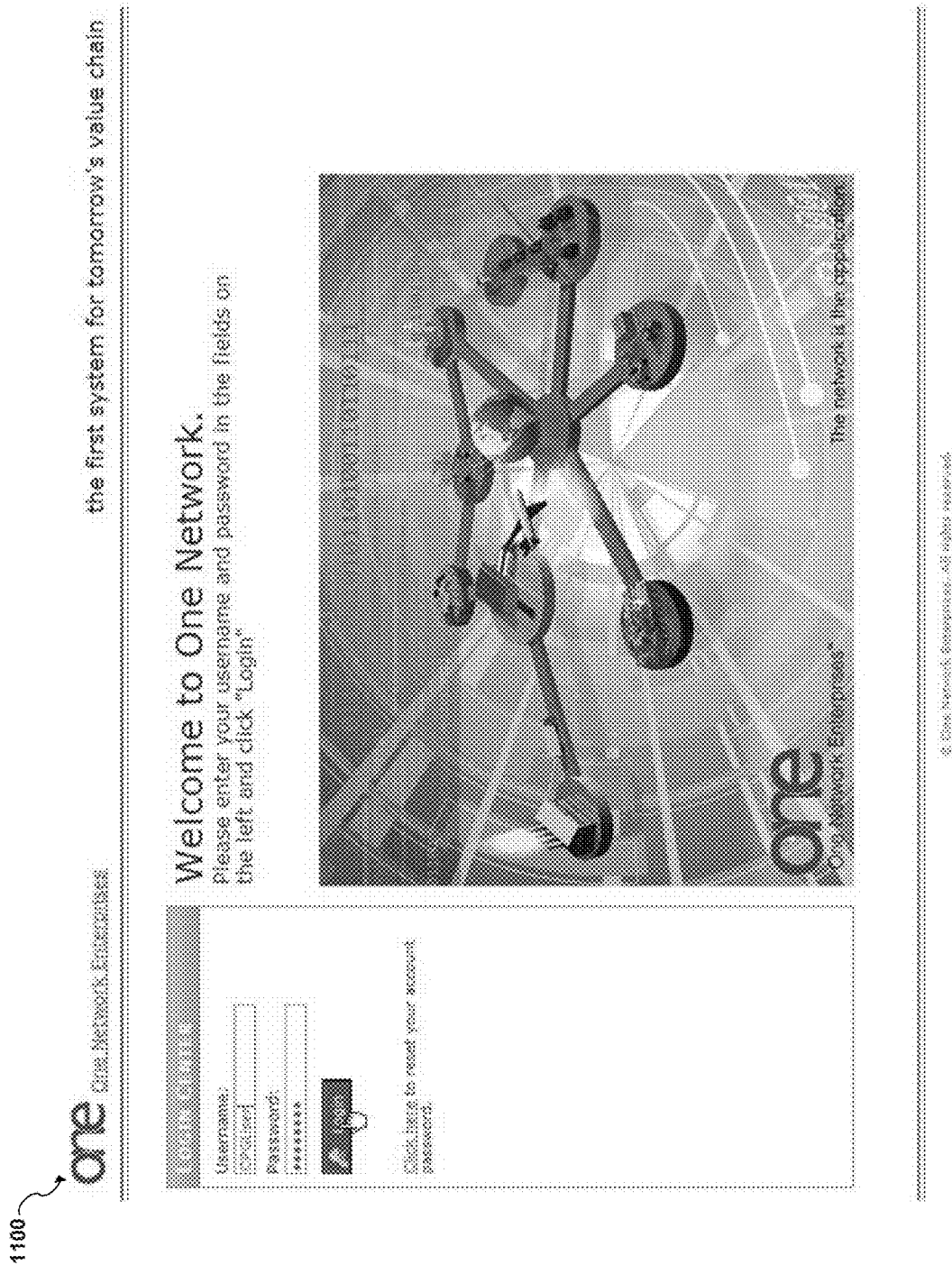
Figure 5C:
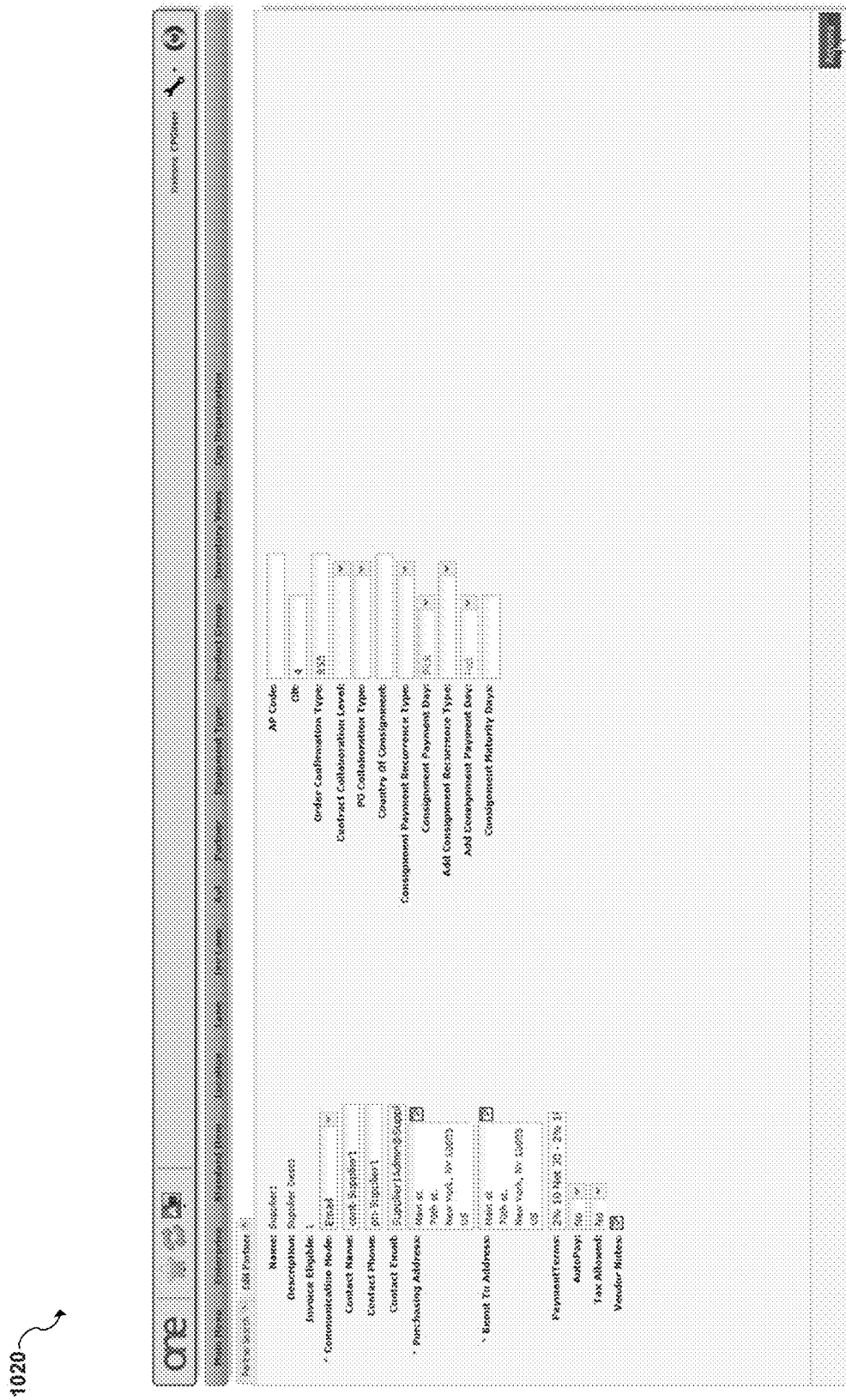

According to the present invention, each company and/or entity logs-in either directly or indirectly with computers/ servers 116, 118 and/or 120 or otherwise is in communication with such. For instance, according to one possible non-limiting implementation each company and/or entity logs-in using the graphical user interface shown in FIG. 5A. After such log-in or other communication with computers/ servers 116, 118 and/or 120, each company and/or entity thereby is provided access to master data 172 and transaction data 174. The master data 172 and transaction data 174 are shared with other companies and/or entities such that although each company and/or entity may have different views of the master data 172, as noted above, they share a single data element having an authoritative version of truth (AVOT) with respect to the federated value chain network 100 and the master data 172 and transaction data 174. In particular, in a federated value chain network 100, even though multiple databases are utilized, each data element (master data 172 or transactional data 174) has a single database as its owner. The owning database maintains the authoritative version of truth for a particular transaction.

Other databases subscribe to the owning database for changes related to that transaction. Each company and/or entity is restricted to the value chain and the master data 172 and transaction data 174 by the company's and/or entity's allowed permissibility which may be predefined and/or configurable. The master and transaction data models represent the authoritative version of truth (AVOT) for the federated value chain network 100 and manage the business process.

As shown in FIG. 2, one or more databases include one or more tables and/or data including, without limitation, Invoicing 132, Production Planning 134, Demand Translation 136, Movement Tendering 138, Appointment Scheduling 140, Transportation Optimization 142, Order Aggregation 144, Oder Sourcing 146, Order Promising 148, Order Prioritization 150, Demand Planning 152, Continuous Forecasting 154 and Advanced Replenishment 156. These tables and/or data are further described in related U.S. patent application Ser. Nos. 10/887,468; 12/511,313 and Ser. No. 12/730,805. For instance, Demand Planning 152 and Continuous Forecasting 154 are generally disclosed in U.S. patent application Ser. No. 12/730,805, entitled "Computer Program Product and Method for Sales Forecasting and Adjusting a Sales Forecast."

The Value Chain Planning and Execution engines run on a single instance of the database, thereby enabling an end-to-end multi-echelon solution for multiple business entities coexisting in a many-to-many community network.

Processing Flows

Figure 3A:
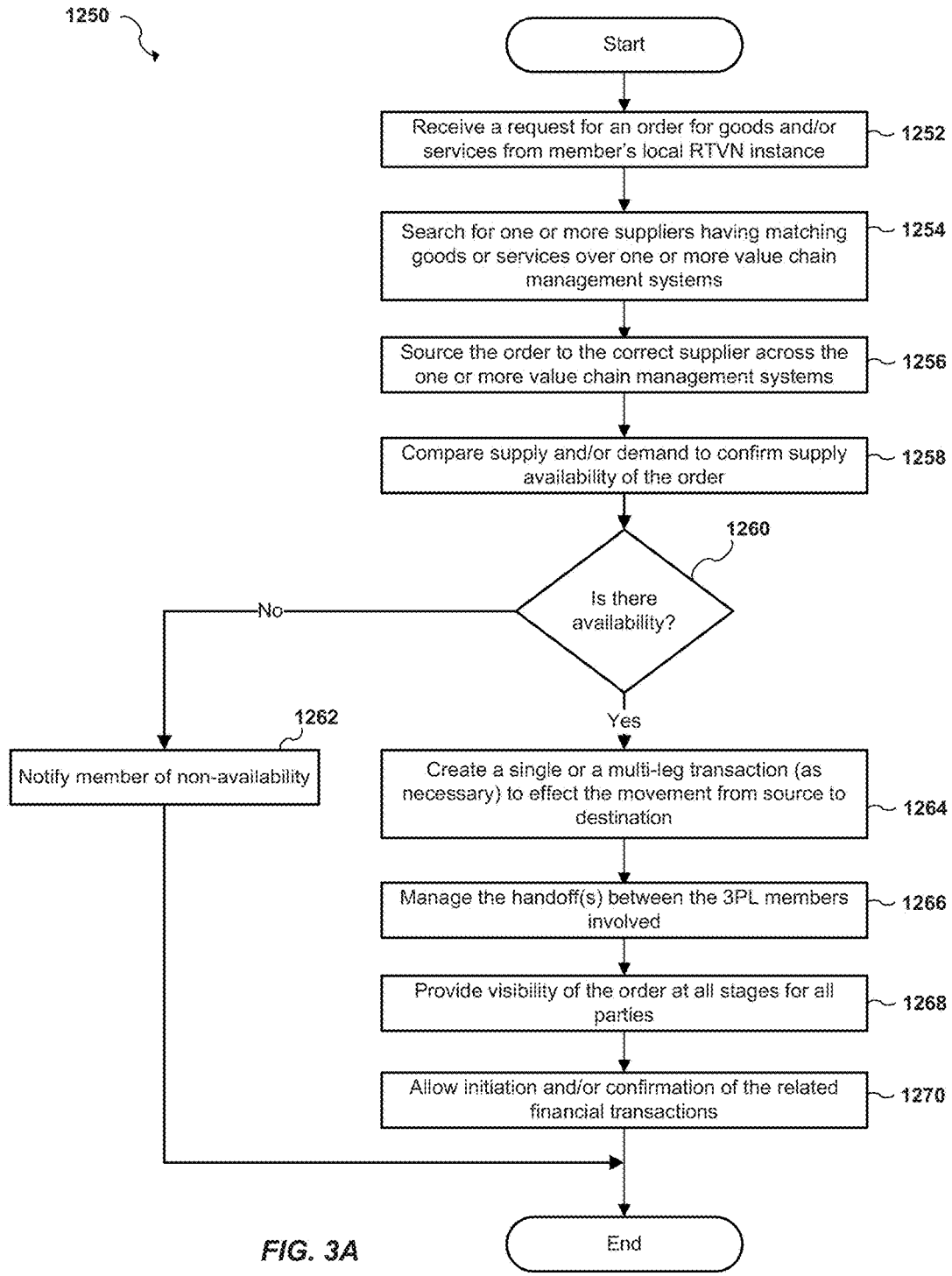
FIG. 3A is flow chart illustrating a method for a global transaction manager in a federated value chain network in accordance with an embodiment of the present invention.

Referring to FIG. 3A, a flow chart illustrating a method for a global transaction manager in a federated value chain network 100 in accordance with an embodiment of the present invention are shown. At block 1252, a request for an order for goods and/or services from member's local RTVN instance is received and processed. A search is performed for one or more suppliers having matching goods or services over one or more value chain management systems using the Global Transaction Manager, at block 1254. At block 1256, the order to the correct supplier across the one or more value chain management systems is sourced. A determination is made to confirm whether there is available supply and/or demand with respect to the order, at blocks 1258 and 1260. If there is no availability, then the member is notified of the non-availability and alternative arrangement may be processed. Otherwise, processing continues at block 1264 where a single or a multi-leg transaction (i.e., one or more geographic segments), as necessary, is created to effect the movement from source to destination (e.g., source to port, surface, port to destination). One or more handoffs are managed between the 3PL members involved, at block 1266. At block 1268, without limitation, visibility of the order for one or more stages (e.g., at all stages) is provided to one or more parties (e.g., all parties involved (1-n), including without limitation shipper, customer, service provider, and the like). Initiation and/or confirmation of the related financial transactions support is provided, at block 1270.

Figure 3B:
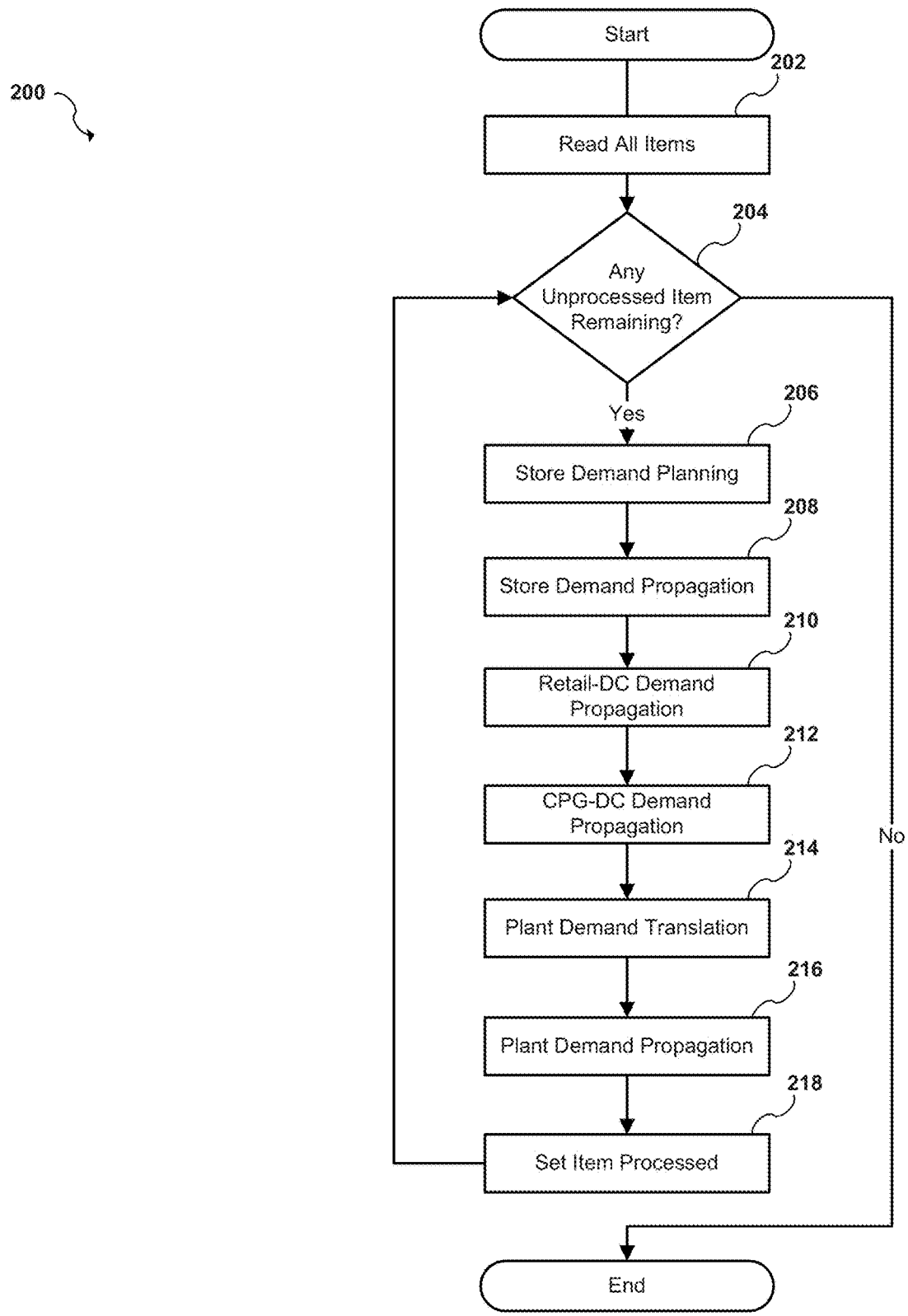
FIGS. 3B-3D are flow charts illustrating a method for implanting and managing a federated value chain network in accordance with an embodiment of the present invention.
Figure 3C:
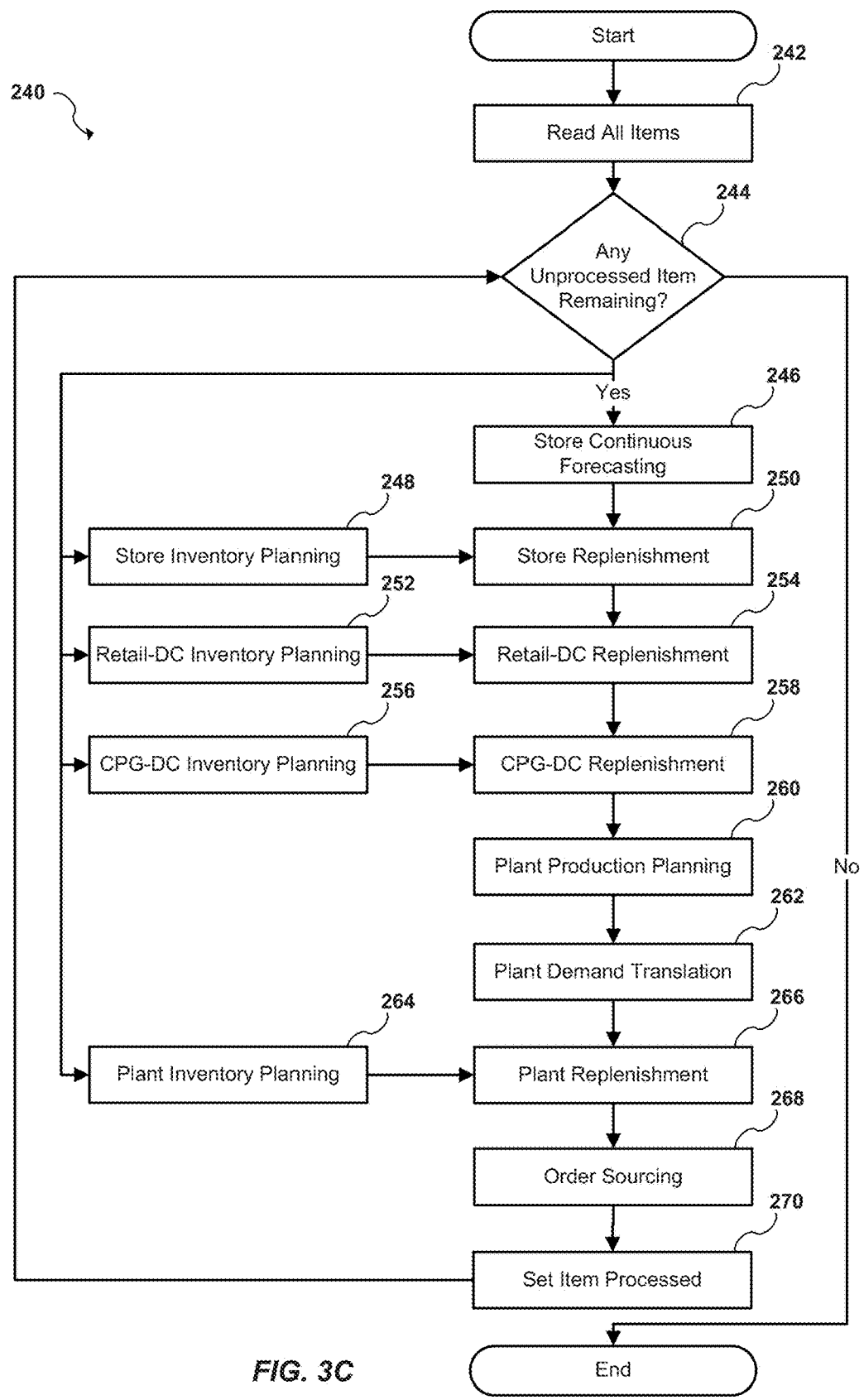
Figure 3D:
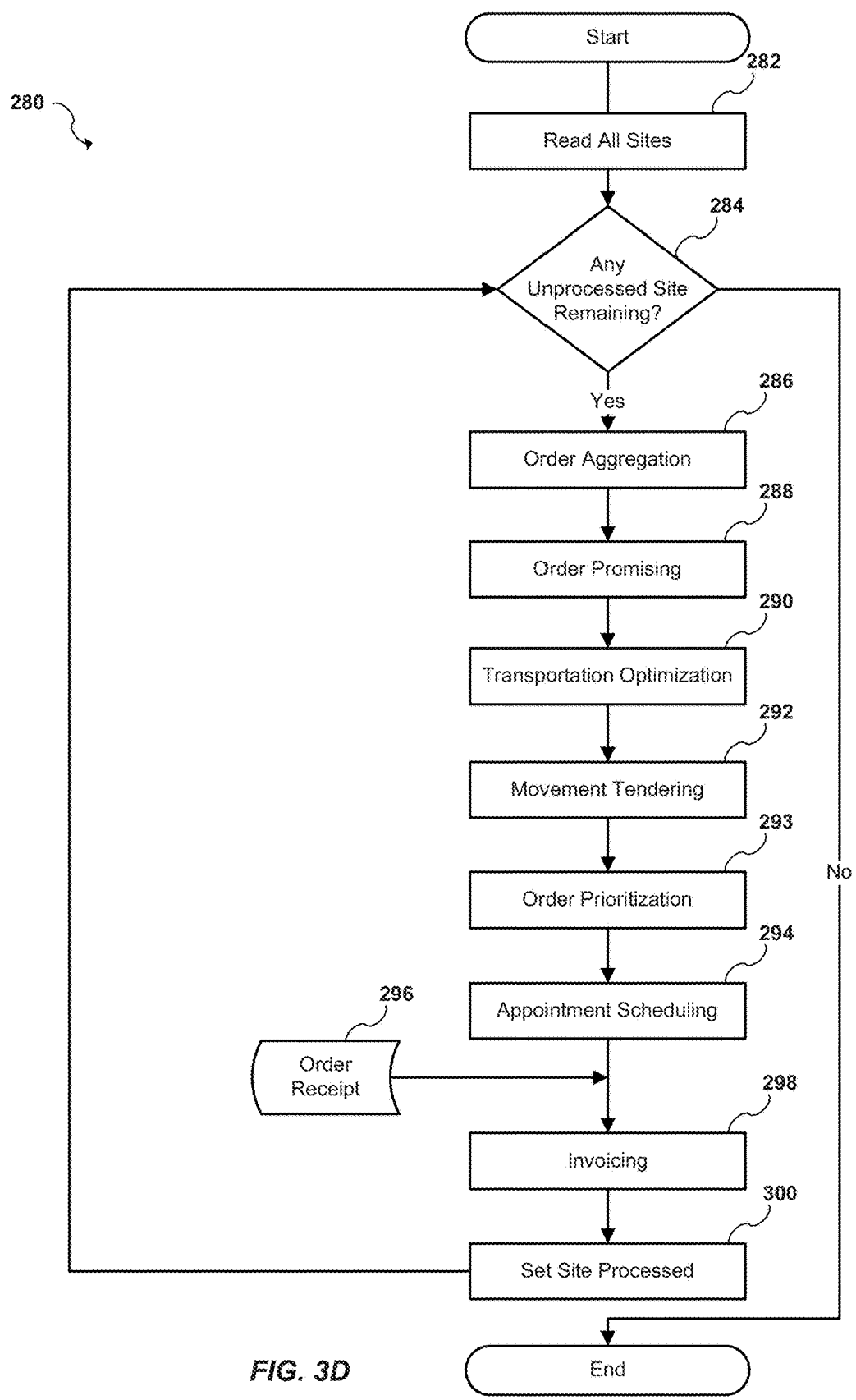

Referring to FIGS. 3B-3D, flow charts illustrating a method for implementing and managing a federated value chain network 100 in accordance with an embodiment of the present invention are shown. FIG. 3B illustrates non-limiting long term planning processing over a federated value chain network 100. As shown in FIG. 3B, the items are read from the database at block 202. At logic block 204, a determination of whether there are any unprocessed items is performed. If all of the items have been processed, then processing ends. Otherwise, if any unprocessed items remain, then processing continues forecasting store sales at block 206. At block 208, store demand propagation occurs. Retail-DC demand propagation and CPG-DC demand propagation occur at blocks 210 and 212, respectively. Plant demand propagation and plant demand translation occurs at blocks 214 and 216, respectively. The item is then marked as processed at block 218 and processing continues at decision block 204 until all of the items by been processed.

FIG. 3C illustrates non-limiting supply replenishment processing over a federated value chain network 100. As shown in FIG. 3C, the items are read from the database at block 242. At logic block 244, a determination of whether there are any unprocessed items is performed. If all of the items have been processed, then processing ends. Otherwise, if any unprocessed items remain, then processing continues at block 246. At block 246, store continuous forecasting occurs. Store inventory planning and store replenishment occurs at blocks 248 and 250, respectively. Retail-DC inventory planning and retail-DC replenishment occur at blocks 252 and 254, respectively. Consumer package good manufacturer (CPG)-DC planning and CPG-DC replenishment occur at blocks 256 and 258, respectively. At block 260, plant production planning occurs. Plant demand translation occurs at block 262. Plant inventory planning and plant inventory replenishment occur at blocks 264 and 266, respectively. At block 268, order sourcing occurs. The item is then marked as processed at block 270 and processing continues at decision block 244 until all of the items by been processed.

FIG. 3D illustrates non-limiting order fulfillment processing over a federated value chain network 100. As shown in FIG. 3D, the sites are read from the database at block 282. At logic block 284, a determination of whether there are any unprocessed sites is performed. If all of the sites have been processed, then processing ends. Otherwise, if any unprocessed sites remain, then processing continues at block 286. Order aggregation and order promising occur at blocks 286 and 288, respectively. At block 290, transportation optimization occurs. Movement tendering occurs at block 292. Order prioritization occurs at block 293. At block 294, appointment scheduling occurs. An order receipt is generated at block 296. The order receipt triggers invoicing at block 298. The site is then marked as processed at block 300 and processing continues at decision block 284 until all of the sites by been processed.

Figure 3E:
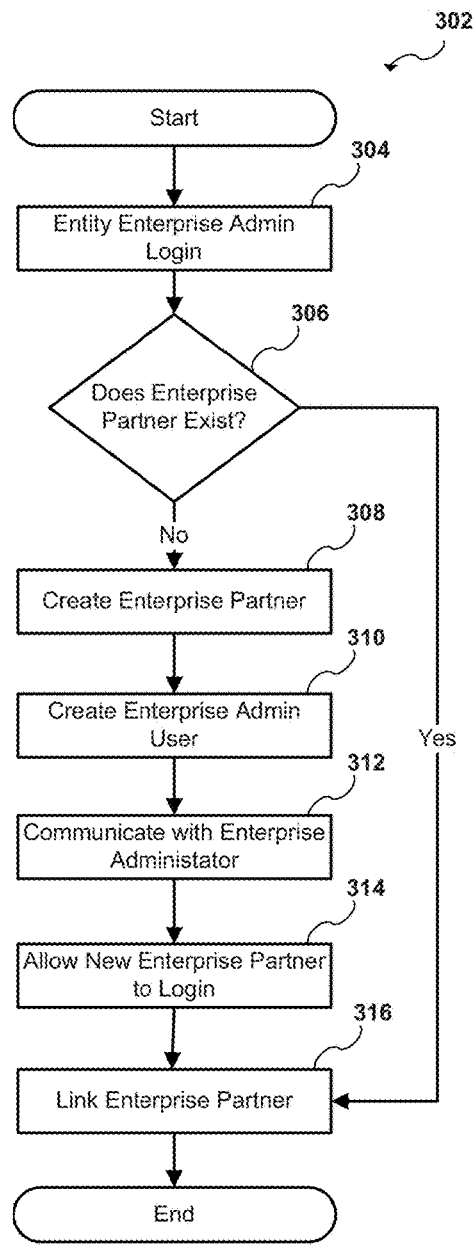
FIG. 3E is a flow chart illustrating a method for adding value chain partners to a federated value chain network in accordance with an embodiment of the present invention.
Figure 3F:
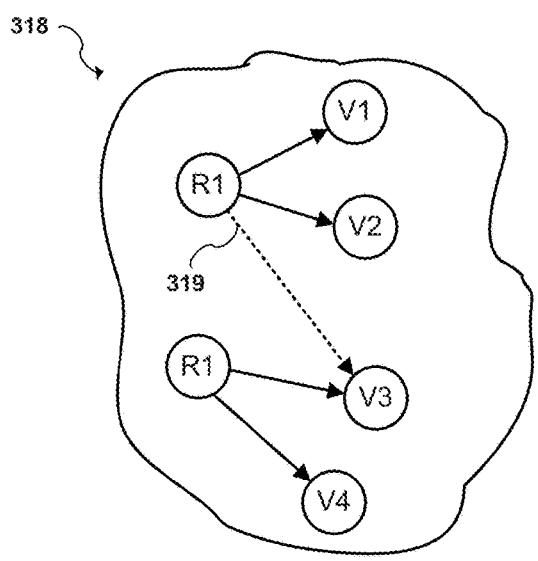
FIG. 3F is a flow chart illustrating an exemplary value chain partner being added to a federated value chain network in accordance with an embodiment of the present invention.
Figure 3G:
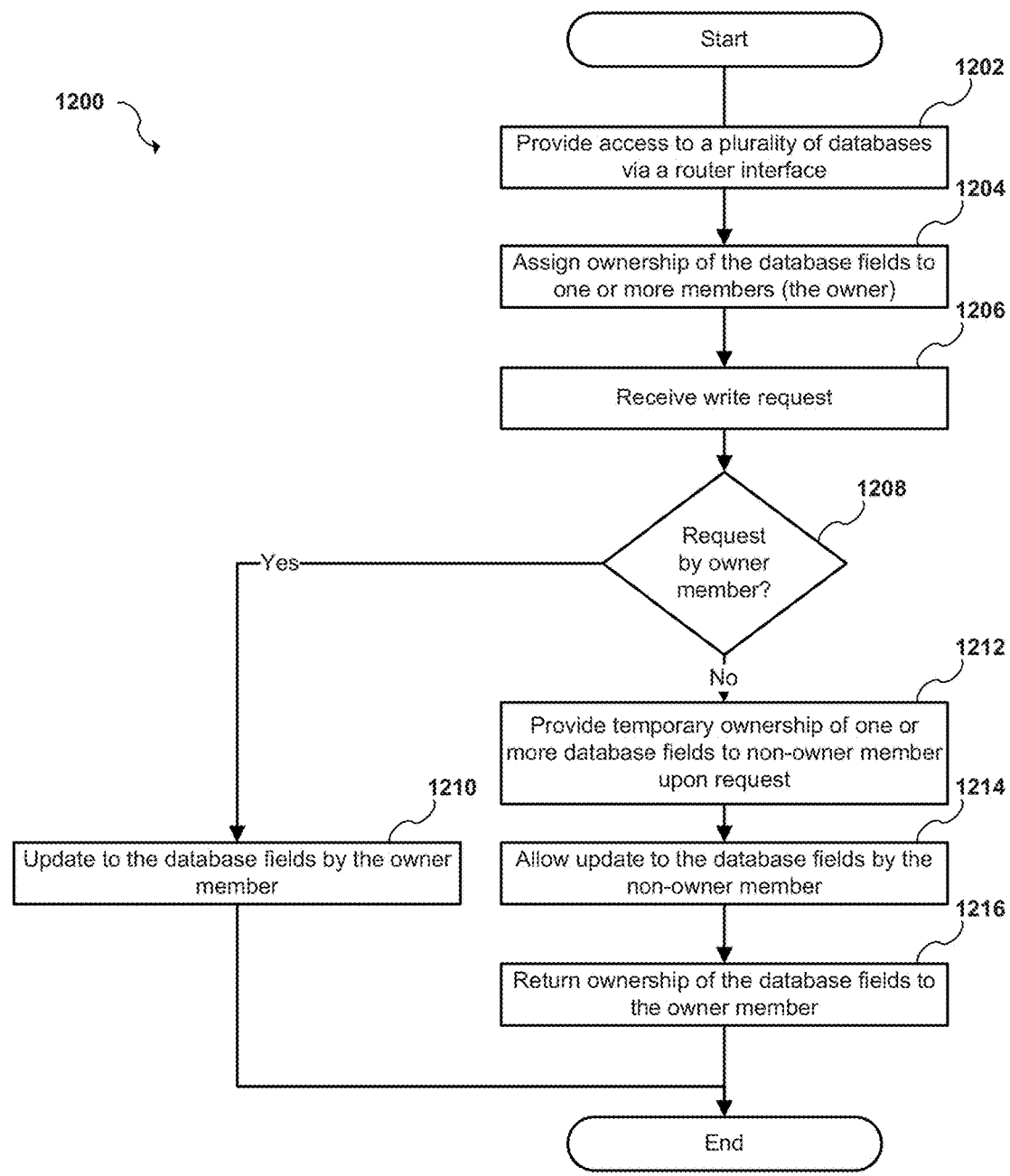
FIG. 3G is a flow chart illustrating an exemplary write request in a federated value chain network in accordance with an embodiment of the present invention.

According to at least one embodiment, companies and/or entities are connected within the federated value chain network 100 as needed. For instance, a flow chart illustrating a method for adding value chain partners to a federated value chain network 100 in accordance with an embodiment of the present invention is shown in FIG. 3E. According to this non-limiting example, an enterprise administrator logs-in either directly or indirectly with computers/servers 116, 118 and/or 120 or otherwise is in communication with such, and requests a partnership with a company and/or entity. A determination is made as to whether that enterprise partner company and/or entity currently exists in the federated value chain network 100 at logic block 306. If the enterprise partner company and/or entity currently exist, then the enterprise partner company and/or entity are linked at block 316. For example, as shown in FIG. 3F, retail company R1 is linked to vendors V1 and V2, and retail company R2 is linked to vendors V3 and V4. Each of these companies exists in the federated value chain network 100. As shown, retail company R1 is linked to vendor V3.

If the enterprise partner company and/or entity do not currently exist, then the enterprise partner company and/or entity are created at block 308. At block 310, an enterprise administrator user is created. The enterprise administrator for the new enterprise partner company and/or entity is sent a communication, such as email or the like, and allowed to log-in at blocks 312 and 314, respectively.

Referring to FIG. 5F, a flow chart illustrating an exemplary write request in a federated value chain network 100 in accordance with an embodiment of the present invention is shown. At block 1202, access is provided to a plurality of databases via one or more router interface(s). At block 1204, ownership of one or more database fields are assigned to owner members. The interface receives a write request, at block 1206. If the request is by the owner, then the field is updated at blocks 1208 and 1210. If the request is not by the owner and the field is shared, then the non-owner member is provided temporary ownership to the dataset field at block 1212. At blocks 1214 and 1216, the field is updated by the non-owner member and temporary owner is returned.

The present invention may utilize or more computer applications. As used herein, a "computer application" is a computer executable software application of any type that executes processing instructions on a computer or embedded in a processor, and an "application" or "application project" are the files, objects, structures, database resources and other resources used in integrating a computer application into a software platform.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

This invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, portions of the invention may be embodied as a method, device, or computer program product. Accordingly, portions of the present invention may take the form of an entirely hardware embodiment or an embodiment combining software and hardware aspects all generally referred to as a "circuit" or "module."

The present invention includes a computer program product which may be hosted on a computer-usable storage medium having computer-usable program code embodied in the medium and includes instructions which perform the processes set forth in the present specification. The storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Computer program code for carrying out operations of the present invention may be written in any programming language including without limitation, object oriented programming languages such as Java®, Smalltalk, C# or C++, conventional procedural programming languages such as the "C" programming language, visually oriented programming environments such as VisualBasic, and the like.

Obviously, many other modifications and variations of the present invention are possible in light of the above teachings. The specific embodiments discussed herein are merely illustrative, and are not meant to limit the scope of the present invention in any manner. It is therefore to be understood that within the scope of the disclosed concept, the invention may be practiced otherwise then as specifically described.

The invention claimed is:

1. A system for implementing a global transaction manager for a plurality of networks having shared access to two or more shared databases on a service provider computer over a network via a database router module, the system comprising:
   a plurality of remote computers in communication with a respective plurality of collaborating entities in a federated value chain network;
   a service provider computer having a computer program stored in non-transient memory and one or more microprocessors;
   a database router module;
   a network interface in communication with a plurality of networks, the service provider computer and the plurality of remote computers over the plurality of networks;
   two or more shared databases in communication with the service provider computer in communication with the plurality of remote computers over the plurality of networks via the database router module, wherein the two or more shared databases are interconnected by means of the database router module and include data representing goods or services offered by a first one or more of the plurality of collaborating entities;
   wherein the service provider computer is programmed by means of the computer program to:
   receive, via the network interface, a first communication representing a request for an order for goods or services from one or more of the plurality of remote computers in communication with a respective second one or more of the plurality of collaborating entities in one of the plurality of networks, wherein at least two of the two or more shared databases are physically deployed in different geographic regions and are connected over a WAN;
   search at least one of the two or more shared databases, via the database router module, for data matching the order for goods or services, wherein the database router module logically interconnects each of the two or more shared databases to form a single logical database in which any portion of the data included within the two or more shared databases has a single database as its owner;

identify one or more of the first one or more of the plurality of collaborating entities having matching data;

transmit, via the network interface, a second communication representing movement of the order for goods or services from a source location to a destination location over one or more segments, wherein the movement involves a third one or more of the plurality of collaborating entities; and transmit, via the network interface, a plurality of communications to manage handoffs between the first, second and third one or more of the plurality of collaborating entities in order to ship the order for goods or services.

2. The system of claim 1, wherein the service provider computer is a cloud computer.

3. The system of claim 1, wherein each of the plurality of networks represent different geographic regions.

4. The system of claim 1, wherein the second one or more of the plurality of collaborating entities are suppliers of the order for goods or services.

5. The system of claim 1, wherein the first one or more of the plurality of collaborating entities is a customer.

6. The system of claim 1, wherein the service provider computer is further programmed to provide visibility of a current state of the order to the first, second and third companies over the federated value chain network.

7. The system of claim 1, wherein the service provider computer is further programmed to determine whether there is available supply or demand for the order.

8. The system of claim 1, wherein the order includes one or more financial transactions, and wherein the service provider computer is further programmed to provide initiation and confirmation of the one or more financial transactions.

9. A system for a global transaction manager the system comprising:

a plurality of remote computers;

a central server;

a network interface in communication with the central server and the plurality of remote computers over a network, the network interface being configured to receive one or more transactions via the network;

a federated value chain network, wherein the federated value chain network includes a plurality of networks having shared access to two or more shared databases on a service provider computer over the plurality of networks via a database router module, wherein the database router module logically interconnects each of the two or more shared databases to form a single logical database in which any portion of data stored within the two or more shared databases has a single database as its owner;

wherein the central server is configured to:

receive a request for an order for goods or services from a first company in one of the plurality of networks in the federated value chain network;

search for one or more second companies having matching goods or services over one or more of the plurality of networks, wherein at least two of the two or more shared databases are physically deployed in different geographic regions and are connected over a WAN;

source the matched one or more second companies;

determine whether there is available supply or demand for the order;

create a transaction over one or more segments to effect movement of the goods or services from a source location to a destination location, wherein the movement involves one or more third companies; and manage handoffs between the first, second and third companies in order to ship the goods or services.

* * * * *